United States Patent
Brehmer et al.

(10) Patent No.: US 7,129,978 B1
(45) Date of Patent: Oct. 31, 2006

(54) METHOD AND ARCHITECTURE FOR AN IMPROVED CMOS COLOR IMAGE SENSOR

(75) Inventors: Kevin E. Brehmer, Morgan Hill, CA (US); Rudolf A. Wiedemann, Fremont, CA (US); Ozan E. Erdogan, San Jose, CA (US)

(73) Assignee: Zoran Corporation, Sunnyvale, CA (US)

( * ) Notice: Subject to any disclaimer, the term of this patent is extended or adjusted under 35 U.S.C. 154(b) by 0 days.

(21) Appl. No.: 09/352,494

(22) Filed: Jul. 13, 1999

Related U.S. Application Data

(60) Provisional application No. 60/092,533, filed on Jul. 13, 1998.

(51) Int. Cl.
   *H04N 5/335* (2006.01)

(52) U.S. Cl. ..................................................... 348/308

(58) Field of Classification Search ................ 348/294, 348/300, 302, 308, 207.99, 222.1, 223.1, 348/229.1, 230.1, 241, 254; 250/208.1
   See application file for complete search history.

(56) References Cited

U.S. PATENT DOCUMENTS

| | | | |
|---|---|---|---|
| 4,518,864 A | 5/1985 | Inuiya |
| 4,630,105 A | 12/1986 | Knop |
| 4,639,772 A | 1/1987 | Sluyter et al. |
| 4,734,778 A | 3/1988 | Kobayashi |
| 4,882,619 A | 11/1989 | Hasegawa et al. |
| 4,896,217 A | 1/1990 | Miyazawa et al. |
| 5,060,001 A | 10/1991 | Kaneda |
| 5,075,716 A | 12/1991 | Jehan et al. |
| 5,298,428 A | 3/1994 | O'Rourke et al. |
| 5,302,778 A | 4/1994 | Maurinus |
| 5,340,978 A | 8/1994 | Rostoker et al. |
| 5,359,190 A | 10/1994 | O'Regan et al. |
| 5,400,072 A | 3/1995 | Izumi et al. |
| 5,408,285 A | 4/1995 | Azegami et al. |
| 5,416,318 A | 5/1995 | Hegyi |
| 5,461,425 A | 10/1995 | Fowler et al. |
| 5,471,515 A | 11/1995 | Fossum et al. |
| 5,497,269 A | 3/1996 | Gal |
| 5,548,773 A | 8/1996 | Kemeny et al. |
| 5,572,372 A | 11/1996 | Sekine et al. |

(Continued)

FOREIGN PATENT DOCUMENTS

JP    04223453 A    8/1992

(Continued)

OTHER PUBLICATIONS

Masakazu Aoki et al. (Feb. 13, 1980) Advances in CCD and Imaging.

(Continued)

*Primary Examiner*—Tuan Ho
(74) *Attorney, Agent, or Firm*—Lowrie, Lando & Anastasi, LLP

(57) ABSTRACT

According to the principles of this invention, an improved CMOS image sensor is disclosed. The improved CMOS image sensor comprises a pair of controllable column and row decoders, a signal conditioning circuit and a pixel processor in addition to an array of photo sensors. With the pair of controllable column and row decoders, photo sensors can selectively and dynamically accessed to improve signal throughput for applications that do not require the full set of signals from the array of photo sensors. The digitized signals from the selected photo sensors can be processed in the pixel processor for auto focus, pixel signals decimation and interpolation, data conversation and compression. Consequently, the design complexity of an overall imaging system using the disclosed CMOS image sensor is considerably reduced and the performance thereof is substantially increased.

28 Claims, 17 Drawing Sheets

U.S. PATENT DOCUMENTS

| | | |
|---|---|---|
| 5,600,486 A | 2/1997 | Gal et al. |
| 5,625,451 A | 4/1997 | Schiff et al. |
| 5,665,959 A | 9/1997 | Fossum et al. |
| 5,780,884 A | 7/1998 | Kumagai et al. |
| 5,821,532 A | 10/1998 | Beaman et al. |
| 5,841,126 A * | 11/1998 | Fossum et al. .......... 250/208.1 |
| 5,850,195 A | 12/1998 | Berlien et al. |
| 5,861,645 A | 1/1999 | Kudo et al. |
| 5,869,857 A | 2/1999 | Chen |
| 5,880,691 A | 3/1999 | Fossum et al. |
| 5,883,830 A | 3/1999 | Hirt et al. |
| 5,886,659 A | 3/1999 | Pain et al. |
| 5,923,369 A | 7/1999 | Merrill et al. |
| 5,949,483 A | 9/1999 | Fossum et al. |
| 5,965,871 A | 10/1999 | Zhou et al. |
| 5,969,758 A | 10/1999 | Sauer et al. |
| 5,981,932 A | 11/1999 | Guerrieri et al. |
| 5,990,506 A | 11/1999 | Fossum et al. |
| 5,995,163 A | 11/1999 | Fossum et al. |
| 6,066,822 A | 5/2000 | Nemoto et al. |
| 6,091,502 A | 7/2000 | Weigl et al. |
| 6,122,009 A | 9/2000 | Ueda |
| 6,122,084 A | 9/2000 | Britz et al. |
| 6,130,423 A | 10/2000 | Brehmer et al. |
| 6,137,535 A | 10/2000 | Meyers |
| 6,290,382 B1 | 9/2001 | Bourn |
| 6,324,606 B1 | 11/2001 | Lenehan et al. |
| 6,326,142 B1 | 12/2001 | Royer |
| 6,335,759 B1 | 1/2002 | Harada |
| 6,529,689 B1 | 3/2003 | Oshima |
| 6,597,399 B1 * | 7/2003 | Horii .......................... 348/308 |
| 6,618,083 B1 * | 9/2003 | Chen et al. ................. 348/243 |
| 6,625,558 B1 | 9/2003 | Van Ausdall et al. |
| 2002/0011554 A1 | 1/2002 | Brehmer et al. |
| 2002/0044215 A1 | 4/2002 | Takagi et al. |
| 2002/0101528 A1* | 8/2002 | Lee et al. ................... 348/304 |
| 2003/0112351 A1* | 6/2003 | Clark ........................ 348/307 |
| 2003/0137595 A1 | 7/2003 | Takachi |

FOREIGN PATENT DOCUMENTS

| | | |
|---|---|---|
| JP | 10-174114 | 6/1998 |
| JP | 10246848 A | 9/1998 |

OTHER PUBLICATIONS

Shinya Ohba et al. (1995 IEEE) Vertical Smear Noise Model for an MOS-Type Color Imager.

D. Renshaw et al. (1990 IEEE) Asic Vision.

John E. Tanner (SPIE vol. 1155 1989) A High-speed Video Camera and Recorder.

D Renshaw et al. ( 1990 IEEE) Asic Image Sensors.

P.B. Denyer et al. (1993 IEEE) CMOS Image Sensors for Multimedia Applications.

Orly Yadid-Pecht et al. (1991 IEEE) A random Access Photodiode Array for Intelligent Image Capture.

Fumihiko Andoh ( ISSCC 1990) Image Sensors, Processors, and Displays.

Peter J.W. Noble (1968 IEEE) Self-Scanned Silicon Image Detector Arrays.

Chamberlain, S.G., "Photosensitivity and Scanning of Silicon Image Dector Arrays," IEEE Journal of Solid-State Circuits, Dec. 1969, pp. 333-342.

Karasawa et al., "Flip Chip Interconnection Method Applied to Small Camera Module," 2001, Electronic Components and Technology Conference.

Ohba, et al., "MOS Area Sensor: Part II—Low-Noise MOS Area Sensor with Antiblooming Photodiodes," IEEE Transactions on Electron Devices, vol. Ed. 27, No. 8, Aug. 1980, pp. 1682-1687.

Schaufelbuhl et al., "Uncooled Low-Cost Thermal Imager Based on Micromachined CMOS Integrated Sensor Array," Dec. 2001, Journal of Microelectromechanical Systems, vol. 10, No. 4, pp. 503-510.

Sengupta et al., "Packaging Requirements and Solutions for CMOS ImagingSensors," 1998; International Electronics Manufacturing Technology Symposium; pp. 194-198.

* cited by examiner

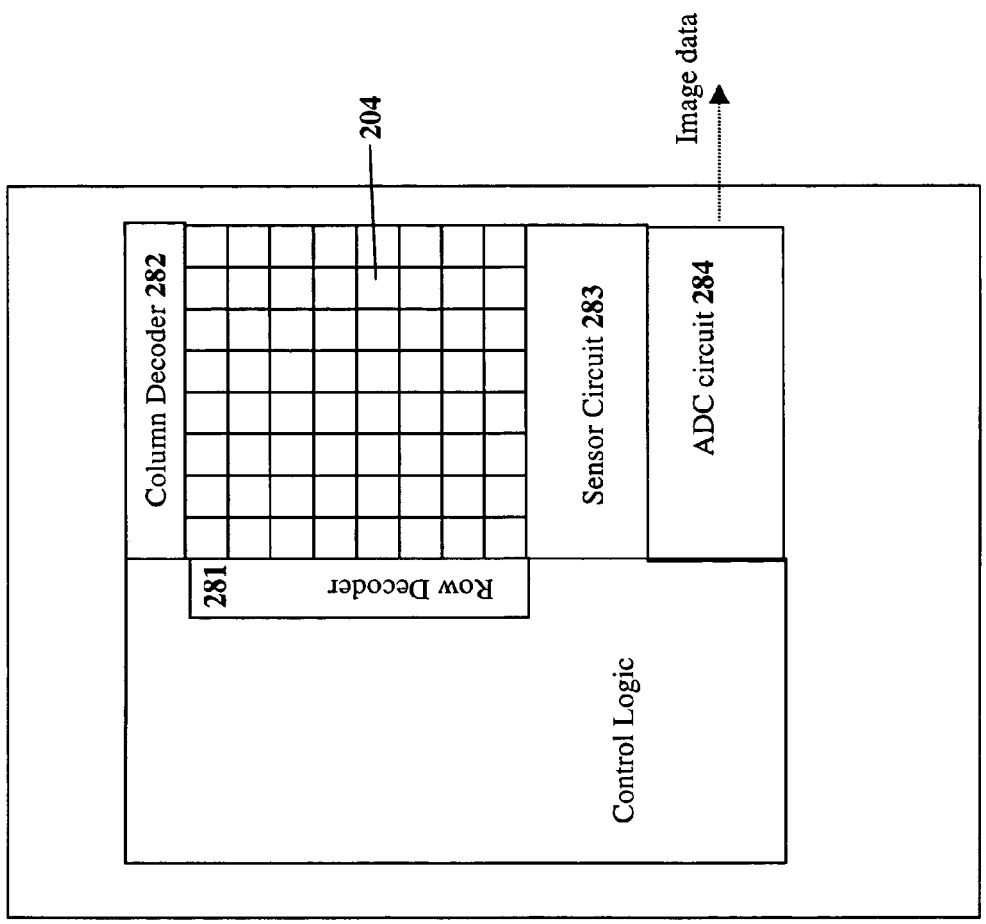

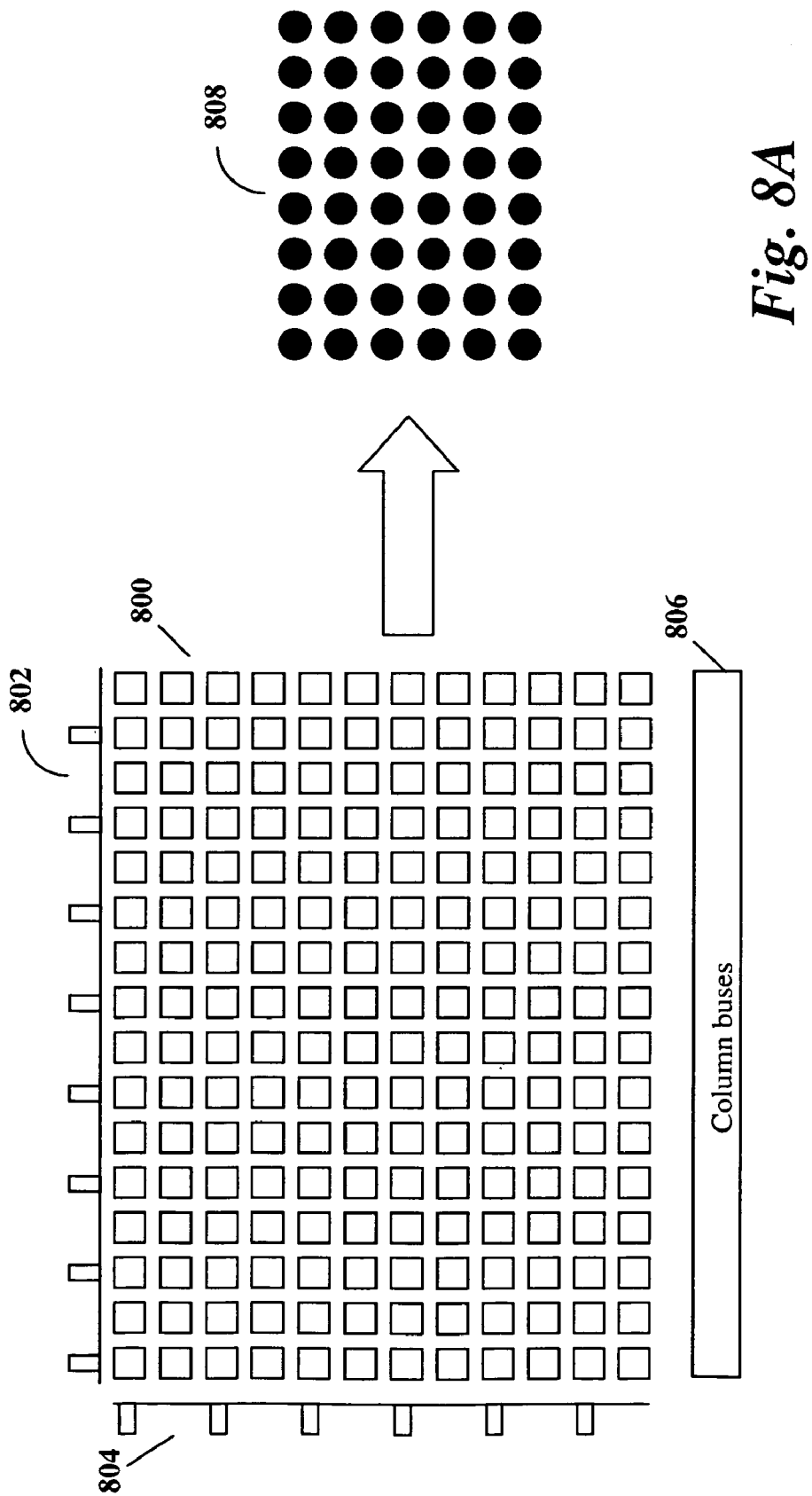

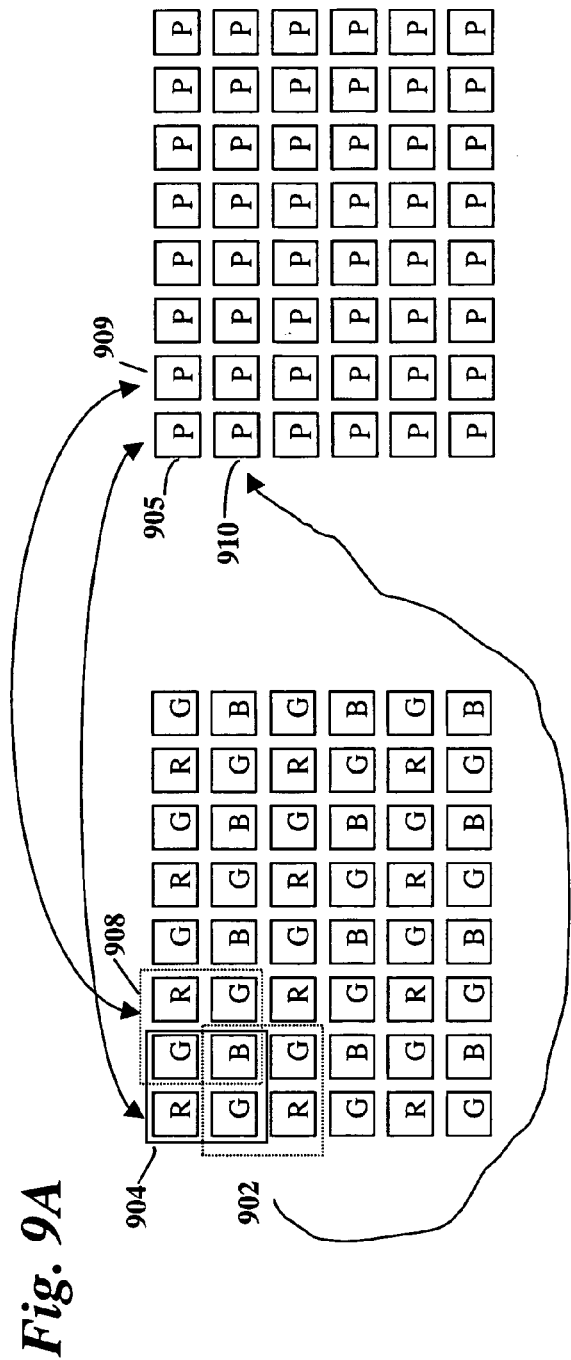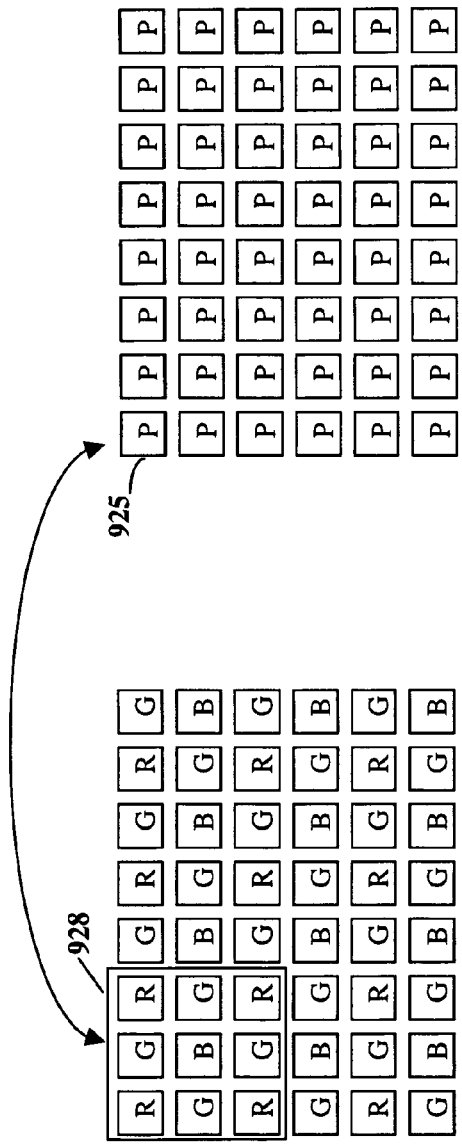
Fig. 9A
Fig. 9B

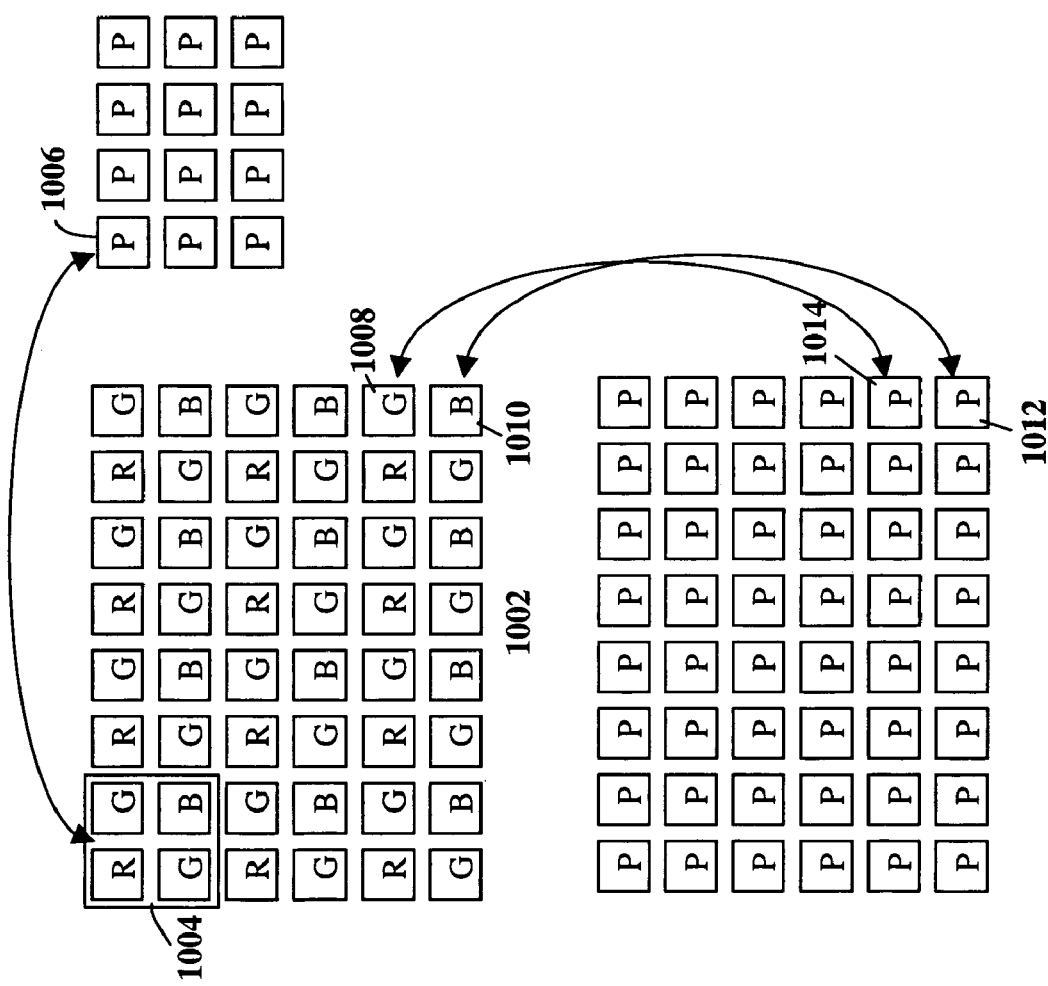

METHOD AND ARCHITECTURE FOR AN IMPROVED CMOS COLOR IMAGE SENSOR

CLAIM OF PRIORITY

This application claims priority based on the provisional application with Ser. No. 60/092,533 that was filed on Jul. 13, 1998 with the U.S. Patent and Trademark Office entitled "Method and Apparatus for A CMOS Image Sensor With A Pixel Processor", which is hereby incorporated by reference for all purposes.

FIELD OF THE INVENTION

The present invention generally relates to image sensors and more particularly relates to a method and architecture for an improved CMOS color image sensor having a pixel processor integrated therewith. The improved CMOS color image sensor provides dynamic access to photo-sensors therein for improved signal throughput and, along with the pixel processor, for tasks including preview, digital zoom, shuttle control, color balance, and gray-scale readout.

BACKGROUND OF THE INVENTION

Digital photography is one of the most exciting technologies that emerged in the past ten years. With the appropriate hardware and software (and a little knowledge), anyone can put the principles of digital photography to work. Digital still and video cameras are on the cutting edge of digital photography. Recent product introductions, technological advancements, and price cuts, along with the emergence of email and the World Wide Web, have helped make the digital cameras the hottest new category of consumer electronics products.

Unlike traditional cameras that use film to store an image, digital cameras use a photosensitive device called an image sensor. Until recently, the dominant and nearly only solid-state image sensor technology was the charge-coupled device (CCD). However, most microprocessors, logic circuits, ASICs (application-specific integrated circuits), and memory circuits are based on Complementary Metal Oxide Semiconductor (CMOS) technology. Logically, CMOS will be used for image sensors in a rapidly expanding sphere of applications.

Several important factors have contributed to the emergence of CMOS image sensor arrays at this time rather than 10 years ago. The primary factor is a recent demand by customers for portable, low power, miniaturized digital imaging systems. A second important factor is that current CMOS technology offers submicron feature sizes and low defect and contamination levels, respectively permitting cost-effective pixel sizes and low junction leakage (or dark) current. In addition, threshold voltage control and uniformity is stable and reproducible. The third important factor is that new circuit techniques have been invented or have been adopted from CCD signal processing that permit both low noise and high-dynamic-range imaging that is competitive with the best CCDs.

A CMOS image sensor array comprises millions of photocells or photo sensors. Each of the photo sensors produces an electronic signal representing the intensity of the light that reflects from a target and falls on it by accumulating a charge; generally the more light, the higher the charge is. After the light integration, the electronic signals from all of the photo sensors are readout and then digitized through an analog-to-digital converter to produce digital image of the target.

FIG. 1 illustrates an exemplary use of a CMOS image sensor in an imaging sensing system 100 such as a digital camera. The image sensing system 100 comprises an optical system 132 for focusing an image onto image sensor array device 130. Readout circuitry 133 reads an electronic image information from the image sensor array 130. The readout circuitry 133 passes analog image signal representing the target image is to an analog-to-digital converter (A/D) 140 for digitization.

The A/D converter 140 digitizes the analog image signal from the image sensor 130 to create a digitized signal that can be appropriately and subsequently stored in memory 150. Typically, an imaging system 100 further comprises a digital signal processing circuitry 160 that performs various processing tasks to put the digital image into a suitable form. For example, the digital signal processing circuitry 160 may adjust, correct, preprocess and compress the digitized signal to eventually output an appropriate digital image or signal. In the embodiment of FIG. 1, the digital signal processing circuitry 160 performs operations necessary to place the image signal into suitable form for display onto display 171 using display driver 170.

As shown in FIG. 1, traditional image sensor arrays could only output image signals that required further signal conditioning before such image signals could be used. For example, the imaging system 100 required digital signal processing circuitry 160 to processes the image signal before it could be passed to the display system. To simplify the design of an image system, it would be desirable to eliminate or reduce the need for a digital signal processor in an imaging system.

SUMMARY OF THE INVENTION

According to the principles of this invention, an improved CMOS image sensor array is disclosed. The improved CMOS image sensor array comprises a pair of controllable column and row decoders, a signal conditioning circuit and a pixel processor in addition to an array of photo sensors. With the pair of controllable column and row decoders, the improved CMOS image sensor array can selectively and dynamically access particular desired photo sensors. Thus, applications that do not require the full set of signals from the entire array of photo sensors can access the desired photo sensors. Along with an on-chip memory, digitized signals from the selected photo sensors can be processed in the pixel processor for auto focus, pixel decimation, pixel interpolation, pixel averaging, data conversation, and compression. The conditioning circuit comprises a correlated double sampling circuit and a programmable gain amplifier. The combination of the two circuits makes it possible to provide color balancing and auto-exposure control in a more precise manner and further facilitates a wider dynamic range by the analog-to-digital converters.

The advantages of the present invention are numerous. Different embodiments or implementations including methods and circuit architecture may yield one or more of the following advantages. By selectively and dynamically accessing signals in the photo sensors, transmission of only a smaller set of useful signals reduces the bandwidth of the buses that otherwise must be high enough to accommodate all the signals readout from the photo sensors. Another important feature of the present invention is the high signal throughput for applications that require only a small selected set of pixel signals from the photo sensor array. For example, a small number of pixel signals may be very quickly read out and processed for applications such as image preview, color balancing, exposure setting, and auto focus. Another important feature in the present invention is the use of the pixel processor that can be configured to perform many internal processing of the image data. Consequently, the design complexity of an overall imaging system using the present invention is considerably reduced and the performance thereof is substantially increased. For example, the image sensor array of the present invention can output digital image information that can be directly used to drive a digital image display.

Other objects and advantage together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2C illustrates a typical CMOS image sensor array;

FIG. 8A illustrates a first example signals from an array of photo sensors are being decimated;

FIG. 9A illustrates four neighboring pixel signals from the R, G, and B photo sensors being co-sited.

FIG. 9B illustrates four neighboring pixel signals from the R, G, and B photo sensors being co-sited.

FIG. 10 illustrates pixel signals from the R, G, and B photo sensors in array of photo sensors are being converted to gray-scale intensities.

DETAILED DESCRIPTION OF THE PREFERRED EMBODIMENT

In the following detailed description of the present invention, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to obscuring aspects of the present invention.

Color Images and CMOS Sensors

Figure 2A:
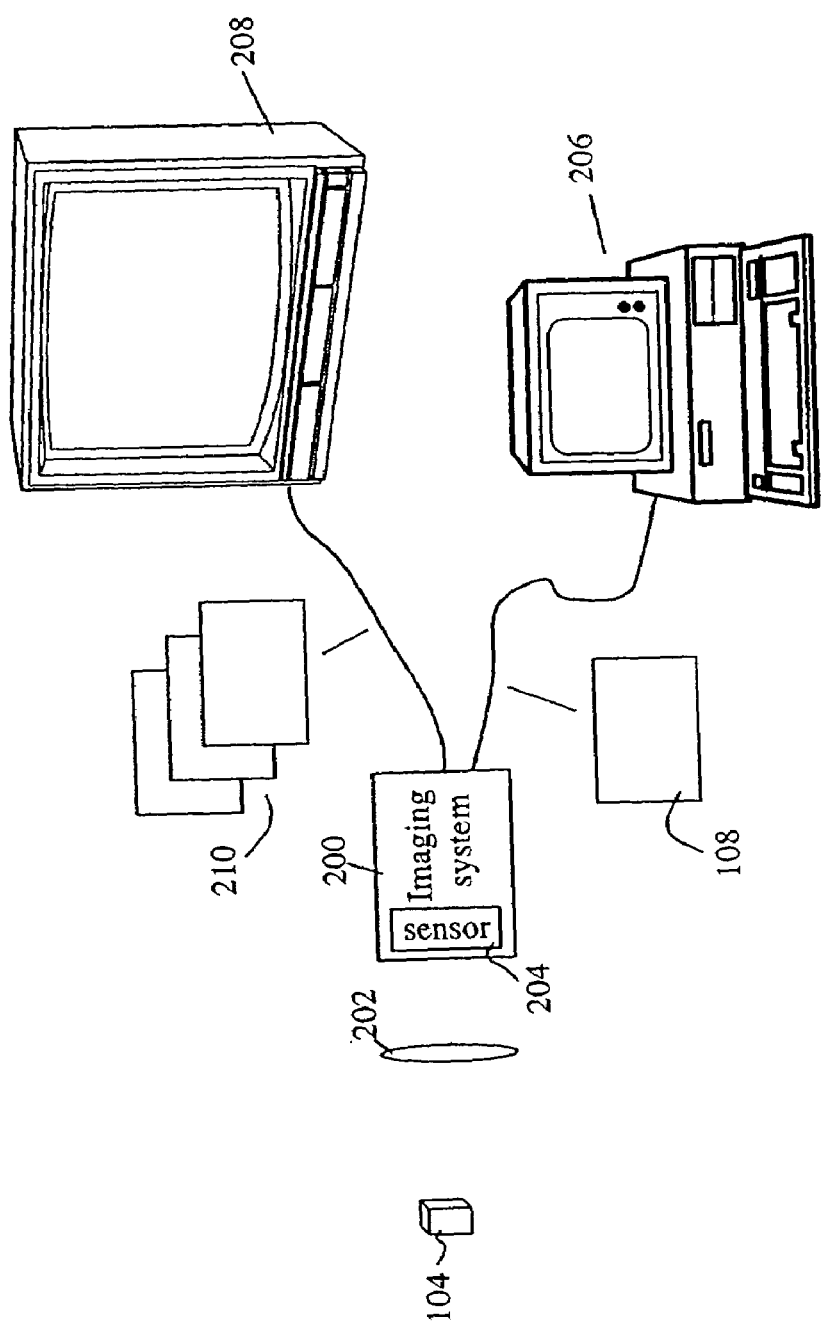
FIG. 2A shows a schematic diagram of a system that uses involving a digital imaging system.

Referring now to the drawings, in which like numerals refer to like parts throughout the several views. FIG. 2A shows a schematic diagram of a system involving a digital imaging system 200. Under either natural or man-made illumination, optics unit 202 collects light reflected from an object 104 and focuses the reflected light onto an image sensor 204. The imaging system 200 subsequently produces digital image data 108 that may be used to display a representation of object 104 on a computer 206. Alternatively, imaging system 200 may produce video signals (sequence of temporal images) 210 that may be displayed on a television system 208.

Depending on the applications, the imaging system 200 (that may be a digital still camera or a digital video camera) may produce a gray-scale or color image. In the case of a gray-scale image, digital image data 108 comprises a plurality of pixels wherein each pixel is represented by a numerical value. The pixel numerical value represents the intensity of incident light impinged upon the image sensor 204 in imaging system 200 from a corresponding location on object 104. For example, if the object 104 is an 8.5-inch by 11-inch paper; resultant image may have a size 850 by 1100 pixels and is represented in 8-bit format wherein each digital pixel value ranges from 0 to 255. This means that each square inch of scanning object 210 is represented by 100 by 100 pixels. If all the pixels from a particular square inch report a value of 255, then the square inch in object 210 is white. Similarly, if all the pixels for a square inch report an output value of zero ("0"), then square inch in object 104 is dark. It can be understood that any pixels having a value between 0 and 255, i.e. the gray scale, represent the light intensity variations of the object 104.

When the imaging system 200 reproduces colors of the object 104, the digital image data 108 from imaging system 200 typically comprises a set of three different light intensity images for three different colors: red, green, and blue. Each of the three light intensity images being an array or matrix of pixels having a value between 0 to 255 when presented in an 8-bit precision format. When the three pixel matrixes are combined, each color pixel C(x, y) in color image 108 is a vector pixel that may be expressed as follows:

$$C(x, y) = \begin{bmatrix} R(x, y) \\ G(x, y) \\ B(x, y) \end{bmatrix}$$

where (x, y) are coordinates of an image pixel and C refers to color image 108 and R, G and B are the respective light intensity values for red, green, and blue light. If a cluster S of corresponding pixels in each of the three intensity images have an identical value, namely R(x, y)=G(x, y)=B(x, y), then spot S on object 104 is colorless. Spot S would appear as a gray that is visually between dark (0) to white (255). Conversely if a cluster of pixels S' has different color intensity value, i.e. R(x, y)≠G(x, y)≠B(x, y), the spot S' on object 104 would be visually colorful. For example, a pure red, green, or blue pixels are expressed as C(x, y)=[255 0 0]$^T$, C(x, y)=[0 255 0]$^T$, or C(x, y)=[0 0 255]$^T$, respectively. To ensure that object 104 can be exactly reproduced as a color image, the imaging system 200 must be well designed to accurately capture the three different color intensity arrays. The three different color intensity arrays are then combined to reproduce the colors of object 104 in the resultant color image.

A CMOS Image Sensor Array

Figure 2B:
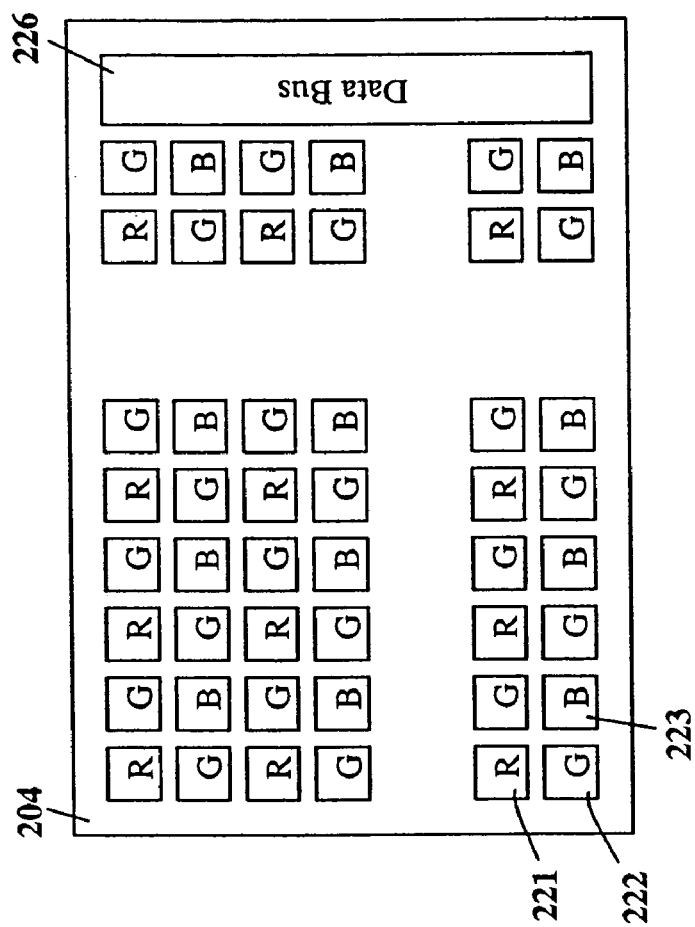
FIG. 2B illustrates a Bayer pattern two-dimensional image sensor array that comprises a plurality of photo sensors fabricated on a Complementary Metal-Oxide Semiconductor (CMOS) device.

FIG. 2B illustrates a block diagram of a typical prior art two-dimensional Complementary Metal-Oxide Semiconductor (CMOS) image sensor array. Each element in the array (such as array elements 221, 222, and 223) is an individual CMOS image sensor circuit. The individual CMOS image sensor circuits are also known as pixel circuits. In a gray scale image sensor, each photo sensor captures light without regard to light color.

In a color image sensor array, as illustrated in FIG. 2B, each of the individual CMOS image sensor circuits may be covered by a selectively transmissive filter. According to one embodiment, there are three selectively transmissive filters, red (R), green (G), and blue (B). Thus, the individual CMOS image sensor circuits superimposed respectively with a red, a green, or a green filter, are reactive to the red, green or blue light components of the incoming light. Therefore, the image sensor array 204 of FIG. 2B produces R, G, and B intensity signals. The photo sensors are highly sensitive to light and each produces a proportional electronic signal with respect to the strength of the incident light.

FIG. 2C illustrates a more detailed embodiment of a CMOS image sensor array. The CMOS image sensor array of FIG. 2C is controlled by row decoder 281 and a column decoder 282. The row decoder 281 and column decoder 282 select a particular CMOS image sensor circuit to be accessed.

The output of an activated CMOS image sensor circuit is carried down a column output line to a sense and hold circuit 283. The sense and hold circuit 283 senses the voltage value of an activated CMOS image sensor circuit. The sensed voltage value is converted into a digital value by an analog to digital converter 284. The digital value can be read out of analog to digital converter 284 by an outside unit.

Improved CMOS Image Sensor Device

Figure 3A:
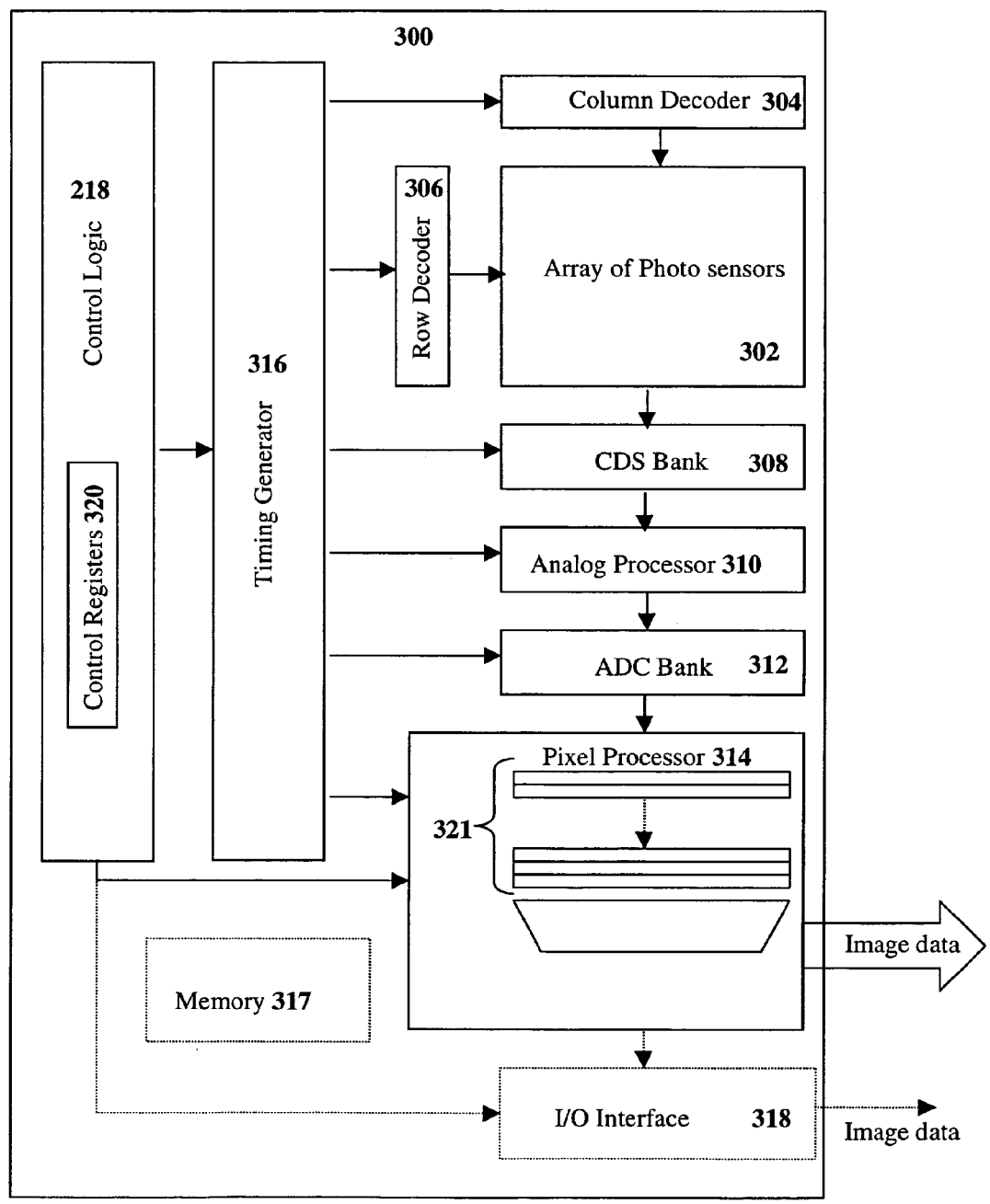
FIG. 3A shows a functional block diagram of an improved image sensor device according to one embodiment of the present invention.

FIG. 3A shows a functional block diagram of an improved image sensor device 300 according to one embodiment of the present invention. As can be seen in FIG. 3A, the improved image sensor device 300 integrates several functions of a digital imaging system onto a single integrated circuit die.

Figure 1:
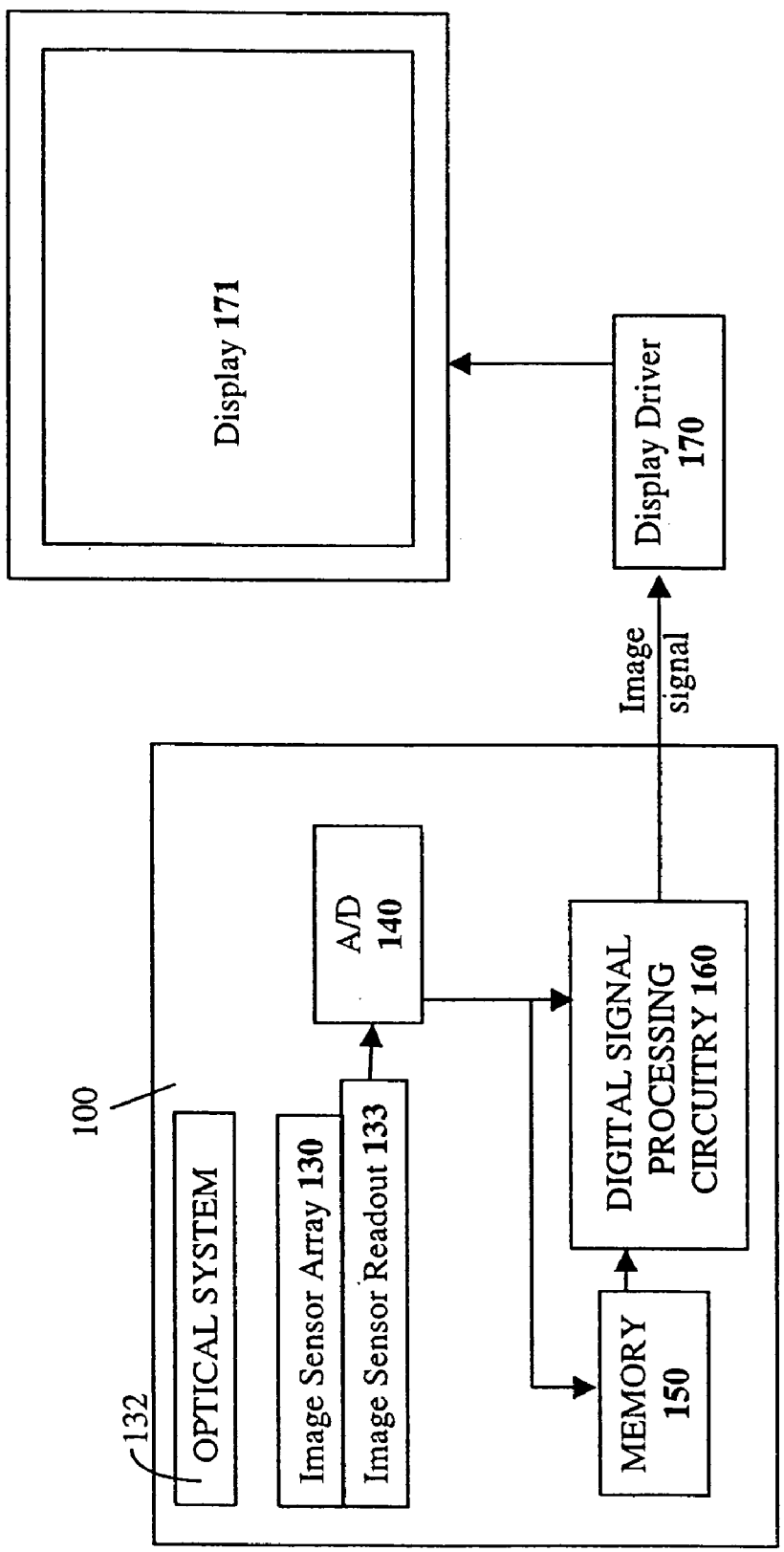
FIG. 1 shows an exemplary use of a CMOS image sensor in an imaging sensing system that comprises an image sensor array device and an optical system.
Figure 4:
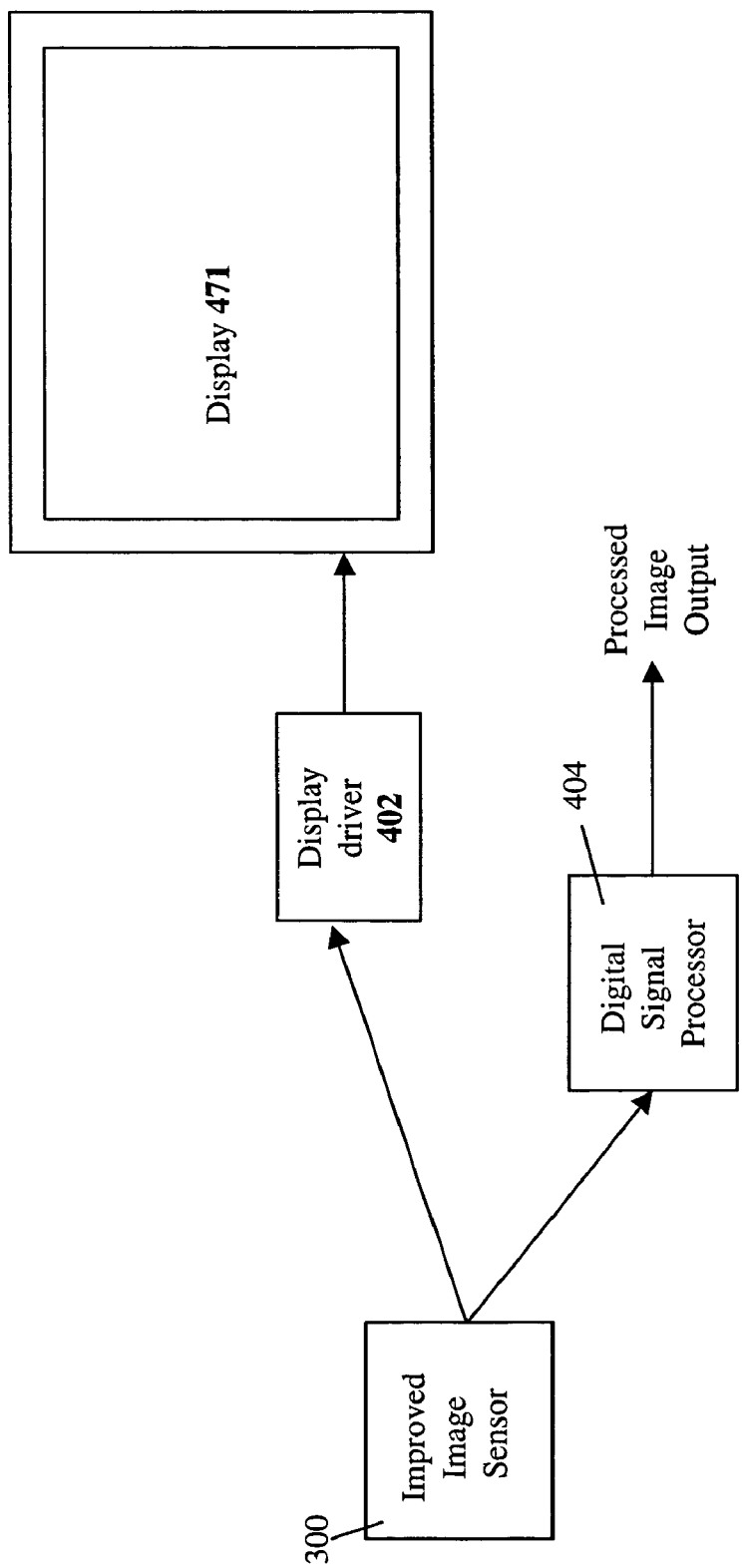
FIG. 4 shows the reduced design complexity of an imaging system employing the improved image sensor of the present invention.

When the image sensor 300 is used in the imaging system 100 of FIG. 1, the design complexity of the imaging system 100 can be significantly simplified as illustrated in FIG. 4. Specifically, when an imaging system is implemented with the improved image sensor device 300, the imaging system can use the output signals from the improved image sensor device 300 directly. Thus, the improved image sensor device 300 may be coupled directly to a display driver 402 for display on a display screen 472. A digital signal processor (DSP) 404 may be coupled to the improved image sensor device 300 for performing more sophisticated processing tasks. For example, the digital signal processor (DSP) 404 may perform object extraction and recognition in robotic vision applications, video streaming for Internet video applications, image compression, image manipulation, and other image processing operations.

The Photo Sensor Array

Figure 3B:
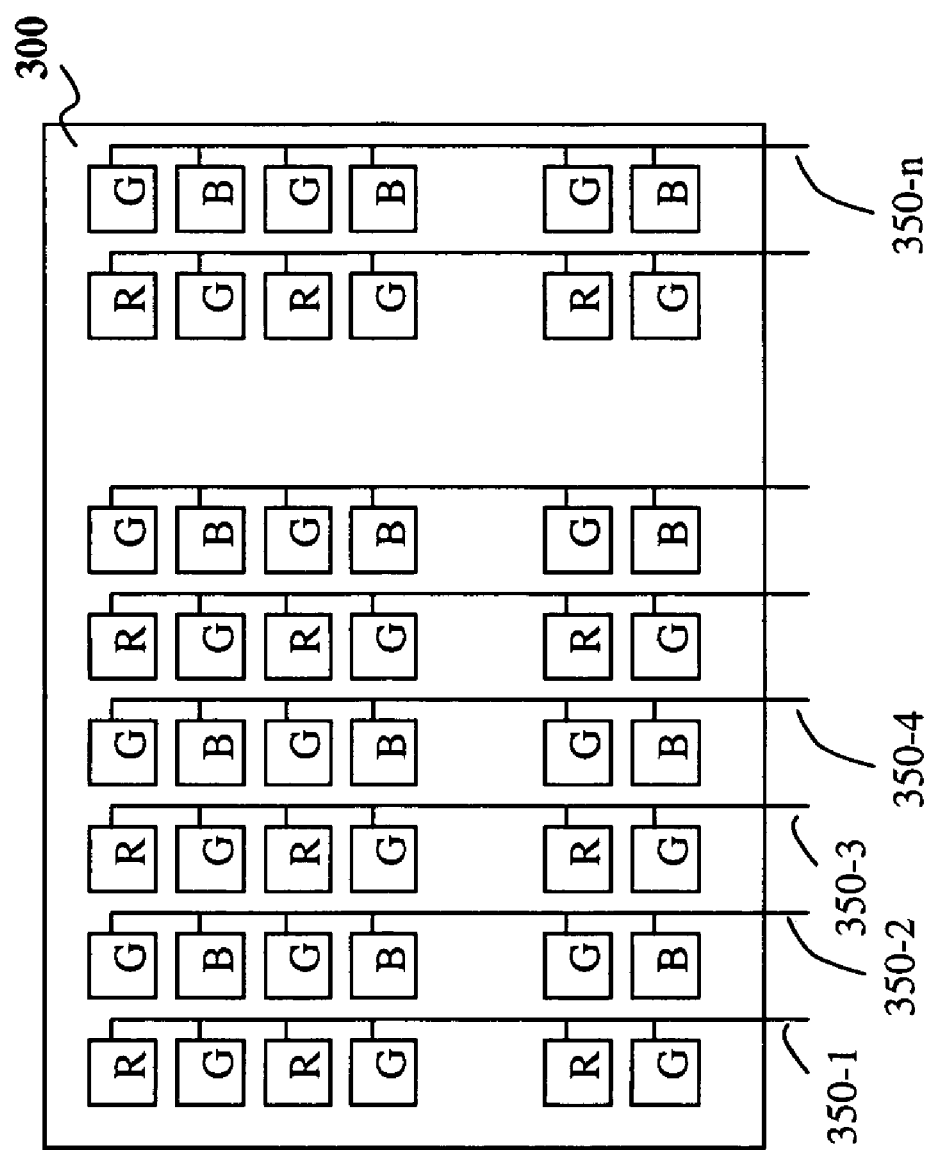
FIG. 3B depicts the Bayer arrangement and each column of the photo sensors is coupled to a readout bus.

The image sensor device 300 comprises an array of photo sensors 302 superimposed with red, green and blue filters. In one embodiment, the arrangement of R, G, and B photo sensors is conformed to the Bayer arrangement. Furthermore, each column of photo sensors is coupled to a readout column bus 350-1, 350-2, . . . 350-n as shown in FIG. 3B. As such, electronic image signals from an entire row of photo sensors can be readout in parallel. According to one embodiment, the image sensor device 300 has an array of 1024 by 768 photo sensors and hence there are 1024 readout buses. Under clock signals from a timing generator 316, it takes 768 cycles to serially read out all of the electronic signals in the image sensor 300 after the light integration process.

Photo Sensor Sampling

As a part of an internal auto-calibration process, the outputs of columns of the photo sensors 302 are carried down the readout buses 350, respectively, to a bank of correlated double sampling circuits (CDS) 308 that sample the signals. In a preferred embodiment, the sampling method of the correlated double sampling circuits (CDS) 308 removes fixed pattern noise from the electronic signals. The fixed pattern noise is unique to CMOS image sensors and considered one of the main disadvantages in comparison with CCD image censors. In a prior art method, canceling the fixed pattern noise can be performed by off-chip storage of the offset values, obtained by reading the output of the photo sensors while they are reset. That method, however, requires a large amount of memory for storing the entire array of offset information.

The image sensor device 300 uses a correlated double sampling circuit 308 that is an efficient on-chip method. During a readout process, two samples are taken: a first sample when a photo sensor is in a reset state and a second sample when the electronic signal from the photo sensor has been transferred to the read-out node.

Analog Pixel Processor

After sampling the image sensor device with a correlated double sampling circuit 308, the analog signals can be processed by an analog pixel processor (APP) bank 310. The analog pixel processor can perform many different types of pixel processing in the analog domain. For example, the analog pixel processor (APP) bank 310 may perform edge detection, motion processing, or color balancing.

In one embodiment, one analog pixel processor is shared for every N columns of the photo sensor array. For example, there may be one analog pixel processor for every eight columns from the photo sensor array. In such an embodiment, the analog pixel processor is shared by the eight columns in a time division multiplexing manner.

This allows a sophisticated analog pixel processor to be created even when the pixel pitch becomes very narrow. In one embodiment, the analog pixel processor comprises a programmable gain amplifier for color balancing. Energy from red, green, and blue light is not absorbed equally by the photo sensors in the photo sensor array 302. Thus, the integration values from red, green, and blue photo sensors must be equalized before being used within an image. Prior art imaging systems performed such color equalization in the digital domain with a digital signal processor long after the photo integration values had been read from the image sensor array. However, such systems lost valuable information from the weaker signals. Specifically, the dynamic range of weaker signals is lost since the digitization range must be set to capture the signal with the largest dynamic range.

One embodiment of an image sensor device built according to the teachings of the present invention uses the analog pixel processor to perform analog color balancing to the integration signals from the image sensor before the integration signals are digitized. Specifically, a programmable gain amplifier (PGA) bank amplifies the signals sampled by the correlated double sampling circuits (CDS) 308. The programmable gain amplifiers can amplify the incoming analog signals with a gain that depends on the measurement from the correlated double sampling circuit 308. In such a manner, the analog electronic signals are properly adjusted before being digitized in one of the analog-to-digital converters (ADC) 312.

In other words, after an analog integration electronic signal from a photo sensor is read out, the analog integration electronic signal is first measured and then adjusted accordingly before it is sent to an ADC for digitization. This technique results in a maximum dynamic range by allowing complete use of a full input range of the ADC bank 312. No dynamic range is lost due to offset in any of the three blocks 308, 310 and 312. By having a wide programmable gain amplifier gain available, the imaging system can operate in a larger range of available light, allowing the analog-to-digital converter (ADC) bank 312 to utilize all of its resolution for each sample.

In the gain amplifiers of many prior art image sensor arrays, all different pixels are amplified using independent controllable amplifiers for all three pixel colors. In such embodiments, green pixels are amplified with a gain of 1.0 (unity gain), red pixels are amplified with a gain of 0.8 to 1.2, and blue pixels are amplified with a gain of 2.5 to 3.0.

In one embodiment of the programmable gain amplifier (PGA) bank 310, the programmable gain amplifier amplifies the green pixels with a predetermined fixed gain value. In one embodiment, the green pixels are amplified with a gain of 1.2. The red and blue pixels are then amplified based upon the amplification gain of the green pixel. In one embodiment, red pixels are amplified with a gain of 1.0 to 1.5 and blue pixels are amplified with a gain of 3.0 to 3.5. Thus, the red and blue amplification values are variable and are normalized to the green value.

It should be noted that each row of pixels from a Bayer pattern photo sensor array will consists of Red and Green pixels or Blue and Green pixels. Thus, the amplification values of every other programmable amplifier in the analog pixel processor 310 may be the same.

Analog to Digital Conversion

After the analog pixel processor bank 310 has amplified the analog integration values, an analog-to-digital converter (ADC) bank 312 digitizes the signals. The output of the analog-to-digital converter (ADC) bank 312 is a set of n-bit digital values for each sampled pixel.

As with the analog pixel processor bank 310, the analog-to-digital converter (ADC) bank 312 may be multiplexed. Specifically, there may be only one analog-to-digital converter device for each N columns in the photo sensor array. Ideally, the number of analog-to-digital converter devices should equal the number of analog pixel processors. In this manner, the two units may be organized in a pipeline fashion.

By multiplexing the analog pixel processor bank 310 and the analog-to-digital converter (ADC) bank 312, the architecture becomes very scalable. The architecture is scalable in two different manners. First, the size of the photo-sensor array can be increased linearly by adding one analog pixel processor and the analog-to-digital converter device for every N columns.

Second, the architecture can be scaled according to finer pitches. For example, if the pixel pitch width decreases from 8 microns to 4 microns, then the multiplexing just needs to be adjusted if the same sized analog pixel processor and analog-to-digital converter device are used. For example, an 8 to 1 multiplexor would be replaced by a 16 to 1 multiplexor. In such a system, the frame rate would decrease unless the clock speed of the analog pixel processor and the analog-to-digital converter device were increased. Furthermore, additional current would need to be supplied to the faster operating analog pixel processor and the analog-to-digital converter device.

Pixel Processor

Resultant digital signals (pixels) from the analog-to-digital converter (ADC) bank 312 are coupled to a pixel processor 314. The pixel processor 314 may perform various tasks on the pixels as to be described in detail below. Depending on applications, the output of the pixel processor 314 may be static image data for still digital camera applications or a stream of image data for video display.

In a simple embodiment, the pixel processor is a register controlled state machine that comprises set of line buffers, associated arithmetic and logic unit (ALU) circuitry, and the control circuitry. The arithmetic and logic unit (ALU) circuitry is controlled by a set of control registers 320 that determine how the pixel processor 314 operates. Using the digital pixel information in the line buffers and the arithmetic and logic unit (ALU) circuitry, the pixel processor 314 may perform many different arithmetic and logical operations on the pixels. By using several line buffers as a type of memory, many filtering operations can be performed by logically combining temporally different versions of the same data.

In a more sophisticated version, the pixel may comprise a processor unit that accesses programs in on-chip memory 317. On-chip memory 317 is primarily loaded with programs that are executed along with the pixel processor 314 to achieve desired results. For example, the output of a sophisticate pixel processor 314 may be in a compressed format such as JPEG (Joint Photographic Experts Group). Alternatively, the pixel processor 314 may perform full or partial compression using MPEG, GIF, or wavelet compression systems.

In the simpler embodiment, the pixel processor 314 may perform just a few of the initial steps of a compression system. For example, the line buffer system may process eight adjacent pixels for performing the early steps of JPEG compression. An image processor (a microprocessor or Digital Signal Processor) is thus given a "head start" on the JPEG processing. The detailed description of the processing by the pixel processor 314 in conjunction with the programs in memory 317 will be provided below.

The pixel processor is programmable such that the processing performed by the pixel processor 314 will vary depending on the particular application. In one embodiment, the pixel processor 314 may be controlled using a set of control registers 320. The control registers may store codes defining the processing to be performed and processing parameters.

The pixel processor 314 is comprised, in part, of a number of pixel data rows 321. The pixel data rows 321 contain pixel data that has been read out from the photo sensor array 301. The pixel processor 314 can combined the various pixel data rows 321 arithmetically and logically. The number of pixel data rows 321 within a particular pixel processor 314 embodiment will be based upon the pixel processing operations that need to be performed.

The improved CMOS image sensor device 300 includes a timing generator 316 that generates the clock signals and other timing references needed by the remainder of the improved CMOS image sensor device 500. To orchestrate the operation of all the different subsystems in the improved CMOS image sensor circuit 300, the improved CMOS image sensor circuit 300 includes control logic 218.

The image data from the pixel processor 314 may be directly streamed out of the pixel processor 314 into another device. In a different embodiment, the output digital signals from the pixel processor 314 are passed to an input/out (I/O) interface 318. The input/out (I/O) interface 318 facilitates the transmission of the digital signals out of the image sensor device 300 to an external part that may be a digital signal processor or a display driver. In either case, the control registers 320 can be programmed to determine how the pixel processor 314 or I/O interface 318 output the data. Specifically, the pixel processor 314 or I/O interface 318 may perform sub-sampling by outputting only a portion of the available data. According to one embodiment, the pixel processor 314, memory 317 and I/O interface 318 are monolithically integrated with the array of photo sensors 302.

Window Gating

Image processing is often done on small areas of a larger overall image array. For example, an auto-focus routine is often performed only used the central "focus area" of an image. Furthermore, a small area of an image containing white pixels may be used to perform "white balancing" in a video camera application. To help indicate the data for such routines is being output, the present invention introduces "window gating". Window gating is used to identify a defined subset of pixels from a larger pixel area. Two different window-gating systems are introduced: random access window gating and serial highlighted window gating Random Access Window Gating Unlike Charge Coupled Device (CCD) image sensors in which electronic signals generated after the light integration must be all sequentially readout, the dynamic access provided by the CMOS image sensor device 300 of the present invention permits selective readout. In other words, signals in a particular area of photo sensors can be read out without reading out all the signals in the sensor. This feature is important to a number of applications that demand high signal throughput when the spatial resolution of the image sensor is increased. For example, it would take a considerable time to readout all 786,432 pixel signals from an image sensor having 1024 by 768 photo sensors thereon while not all of the signals are necessary for determining exposure time and digital zoom.

Referring again to FIG. 3A, there is a pair of column address decoder 304 and row address decoder 306 in the image sensor device 300. With the column address decoder 304 and the row address decoder 306, each of the photo sensors 302 can be selectively accessed. One of the features in the present invention is to utilize the column address decoder 304 and row address decoder 306 to provide an effective readout from the image sensor for auto focus, color balance and exposure control.

Figure 5B:
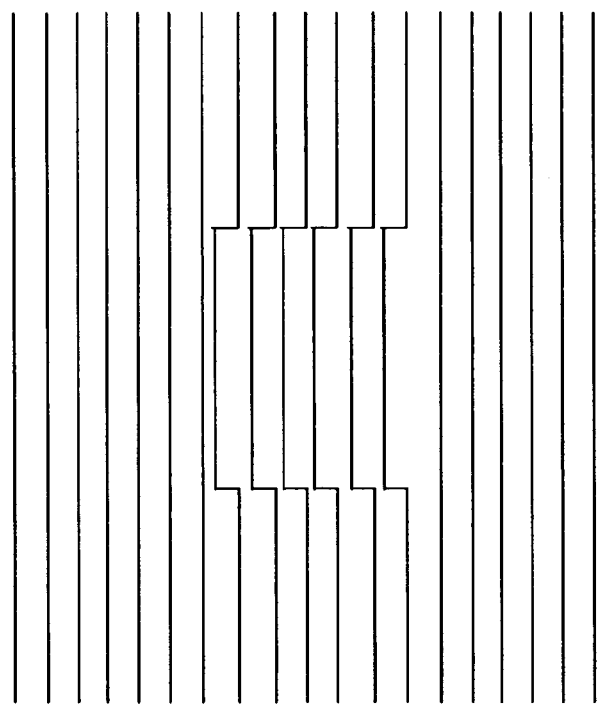
FIG. 5B illustrates a highlighted serial pixel decimation signal for the image sensor of FIG. 5A.
Figure 5A:
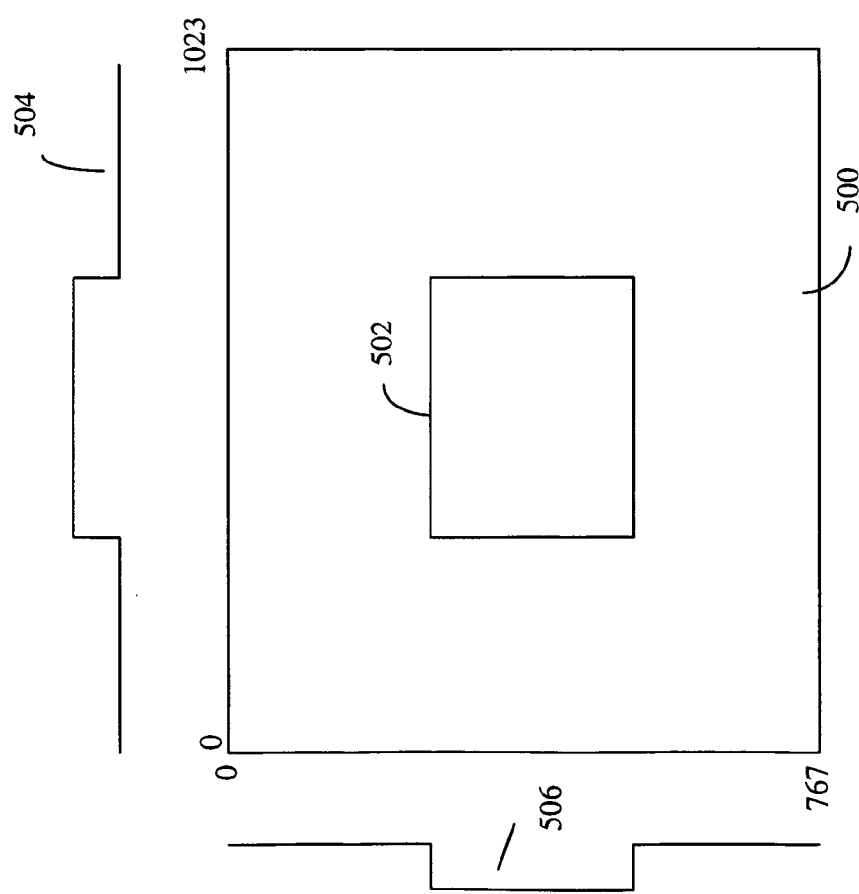
FIG. 5A shows an image sensor having 1024 by 768 photo sensors, wherein each of the photo sensors is addressed by a pair of column address decoder and row address decoder.

Referring to FIG. 5A, there is an image sensor 500 having 1024 by 768 photo sensors thereon and each of the photo sensors is addressed by a pair of column address decoder and row address decoder. A subarea or region of interest (ROI) 502 is defined by parameters that are dependent on the applications. For example, for an auto focus application the region of interest (ROI) 502 is typically small (100 by 100 or 200 by 200) and centered in the image sensor array 500. Therefore, the column address decoder produces column address signals identifying the photo sensors located on columns from 462 to 561 and the row address decoder produces row address signals identifying the photo sensors located on rows from 334 to 433. The column address signals 504 and the row address signals 506 illustrate that region of interest (ROI) 502 is being defined and only the electronic signals in ROI 502 will be readout. It should be noted that the entire array of image sensor array 500 functions in the light integration process. Hence, every photo sensor in the image sensor array 500 has collected charges. However, only the electronic signals in the photo sensors within the defined window gating signals, namely the column address signals 504 and the row address signals 506, are readout. Consequently, the readout process after the light integration process is much faster.

Highlighted Serial Window Gating

Another method of identifying a desired pixel subarea is to use highlighted serial window gating. Highlighted serial window gating operates by signaling when pixels from the desired subarea are being output when an entire pixel array is output. For example, referring to FIG. 5A a pixel array 500 is illustrated. Within the pixel array 500, a smaller desired subarea 502 to be processed is identified with by a rectangle. In one embodiment of the present invention, the subarea 1010 is identified by a first row, a number of rows, a first column, and a number of columns. These parameters can be entered into control registers 320 that control the pixel processor 314 of the present invention.

To inform another circuit coupled to the photo sensor device 300 as to when the pixels in the identified subarea 502 are being output, the present invention uses a window gate signal. The window gate signal is normally inactive. Thus, when the first set of rows of pixel array 500 are scanned, the window gate signal remains inactive as illustrated by the window gate signals 551. However, when the improved photo sensor device 300 of the present invention is scanning out pixels that are within the identified subarea 502, the window gate signal is driven active as illustrated by window gate signals 553. After the photo sensor device 300 has scanned past the pixels of the identified subarea 502, the window gate signal is inactive as illustrated by window gate signals 555.

Using the window gate signal, an area in the center of the image array can be set as the subarea to be identified in a digital camera application. Then, when the autofocus routine needs to be performed, the pixels in the focus area will be identified to a digital signal processor using the windows gate signal.

It is noted that the window gating signals do not have to define a region of interest (ROI) in the center of the image sensor. Furthermore, there can be one or more region of interest (ROI) in the image sensor depending on a specific application.

Figure 6A:
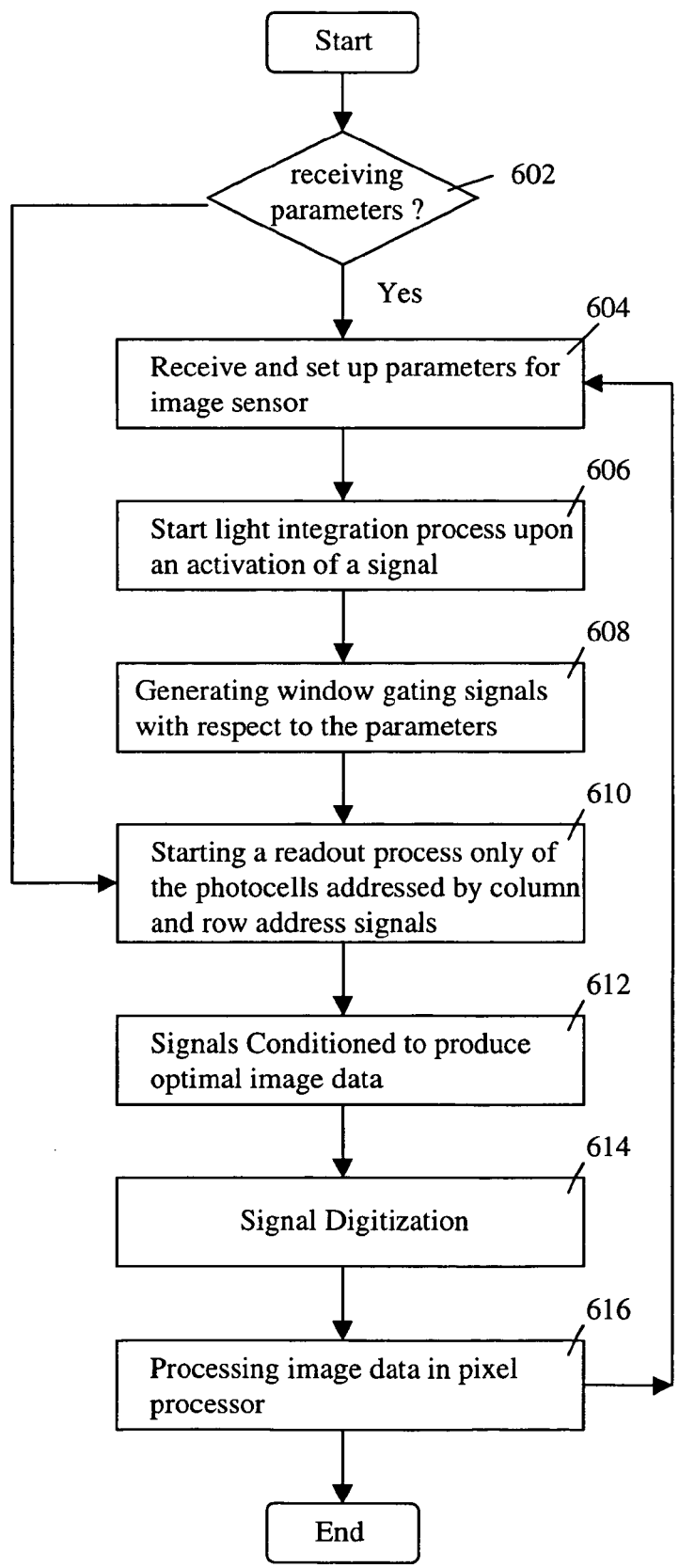
FIG. 6A illustrates a flowchart to illustrate the process for reading out electronic signals from a region of interest (ROI) for auto focus, digital zoom and other similar applications.

FIG. 6A illustrates a flowchart to illustrate the process for reading out electronic signals from a region of interest (ROI) for auto focus, digital zoom and other similar applications. At block 602, before the light integration process, the image sensor device needs a number of parameters to set it up for proper operations. Examples of the parameters include initial electronic shutter speed, initial exposure time, and initial white balance. It is assumed the imaging system is powered on and triggered to start the light integration process. With the parameters, particularly the boundary parameters for one or more region of interest (ROI), loaded at block 604, the image sensor integrates incident light for a defined time to produce an image of a target at block 606. Since the captured image data is for the determining if the imaging system has been properly adjusted, only a small portion image data in the center area of the image sensor is needed. At block 608, the window gating signals are determined with respect to the boundary parameters. In a random access system, the window gating signals cause the column and row address signals to address only the desired portion of the array. In a highlighted serial window gating system, the window-gating signal is active when the desired region is scanned. At block 610, signals only in a small portion of the center area of the image sensor addressed by the column and row address signals are readout to column buses. It should be noted that the order of blocks 606 and 608 are interchangeable. As illustrated in FIG. 6A, if there are no boundary parameters loaded at block 602, all signals in the image sensor will be readout at block 610.

At block 612, the readout signals are processed by the CDS bank and the PGA bank to produce a set of optimal image signals. At step 614, the ADC unit digitizes the analog signals to produce a set of digital signals that represent the area or areas defined by the boundary parameters. The set of digital signals is then processed in the pixel processor at block 616. Depending on the actual use of the set of digital signals, the pixel processor is configured to produce appropriate outputs.

Figure 6B:
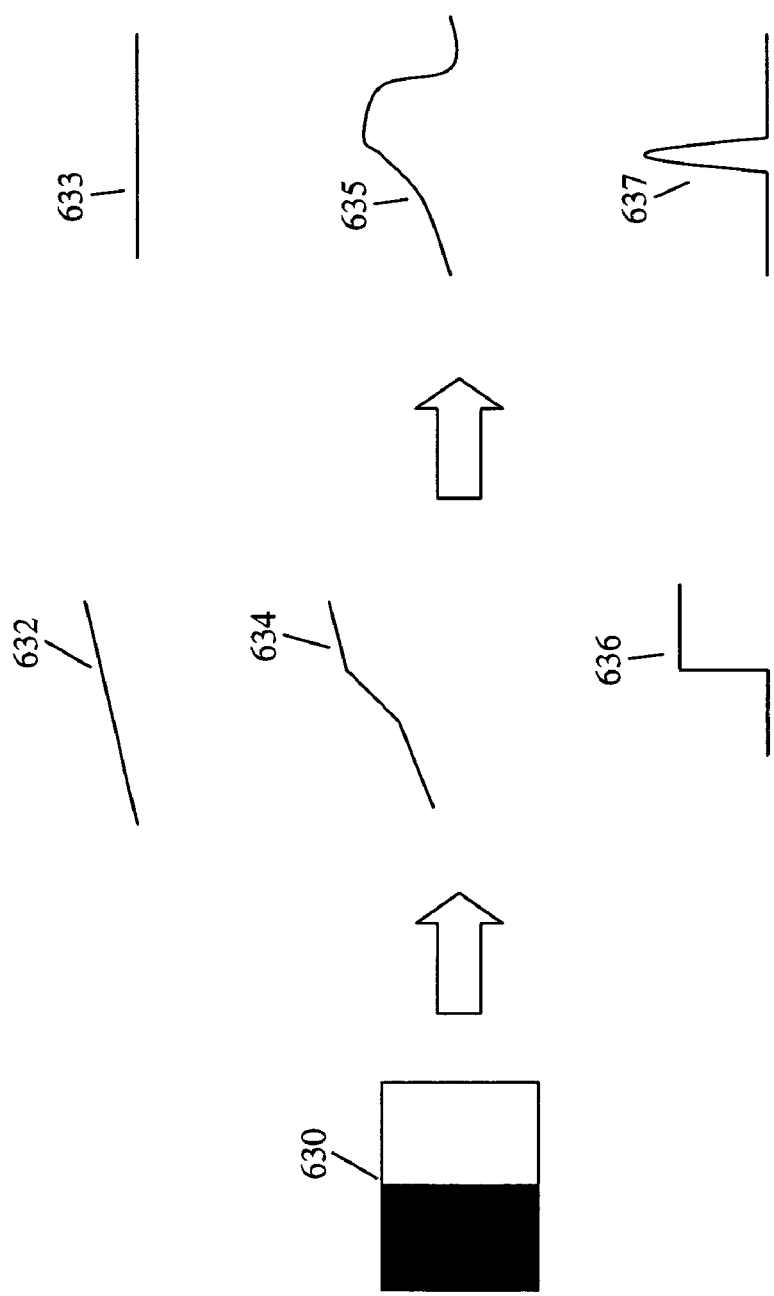
FIG. 6B illustrates an exemplary approach based on derivative calculations for the pixel processor to cause the imaging system to focus on the target consequently to produce in-focus images.

According to one embodiment, one output from the pixel processor is for an auto focus feature. The pixel processor executes a set of instructions to determine if the incoming set of digital signals possesses sharp edges. FIG. 6B illustrates an exemplary approach based on derivative calculations for the pixel processor to cause the imaging system to focus on the target consequently to produce in-focus images. It is assumed that the readout signals represent an image 630 of two contrast areas, thereby there is an edge between the two contrast areas. If the imaging system is out of focus, a single row signal 632 across the two regions tends to be monotonic and the pixel processor can detect from the corresponding derivative signal 633 that the imaging system was out of focus and the output is forwarded to block 604 of FIG. 6A to repeat blocks 606, 608, 610, 612 and 616 with a new setting for the focus.

Another set of digital signals are then generated under the new setting for the focus, one of the signals is represented by a row signal 634. This time the row signal 634 possesses certain discontinuity caused by the edge between the two contrast areas.

The output of the pixel processor based on the corresponding derivative signal 635 causes the imaging system to further adjust the focus thereof and is forwarded to block 604 to start blocks 606, 608, 610, 612 and 616 with another new setting for the focus.

Another set of digital signals is generated, one of which is represented by a row signal 636. The pixel processor can detect from the corresponding derivative signal that the imaging system is now in focus as the corresponding derivative signal possesses a sharp pulse resulting from a sharp edge. It is clear from the context that the focusing processing can be repeated until a determination passes a threshold. The output of the pixel processor may be set to cause a generation of an audible sound so that a user of the system is notified of the status and proceeds to capture images of the target. When it is ensured that the imaging system is in focus of the target, the image sensor is ready to produce a full image of the target.

In a digital camera, the pre-focus process may be triggered by a half-activation of the shuttle button. In a video camera, the pre-focus process may be automatically started when a user presses a "On" or "record" button and before the sensor produces sequence of images. In either application, the auto focus process must be fast enough that the user experiences virtually no latency in capturing a desired target. Those skilled in the art will appreciate that a fast speed is achieved by selectively reading out a small subarea of the full image sensor array and processing just that small area.

It should be pointed that the example in FIG. 6B is for illustration only. Many other approaches may be used by the pixel processor for auto focus application. The important feature of the present invention is the high signal throughput, hence considerable high speed for those applications that require a small set of image data. Reading a full set of image data from the image sensor requires a lengthy time that may cause jitter feeling to the user.

Pixel Interpolation

Figure 7A:
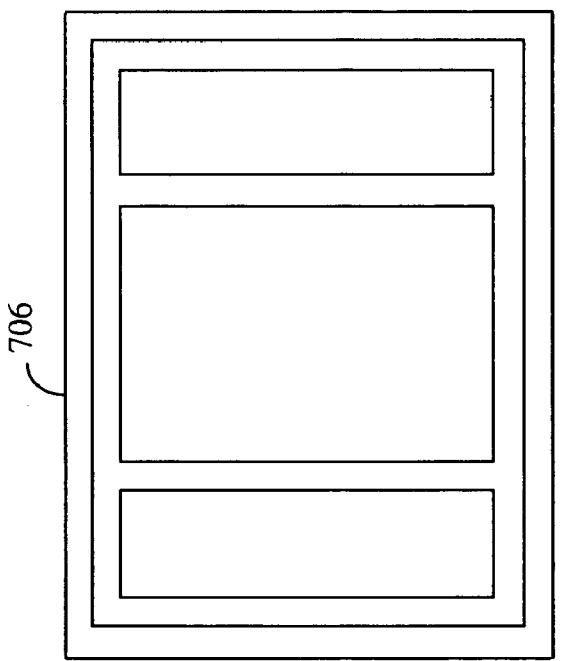
FIG. 7A illustrates that an image sensor is focused on a house but the user is interested in viewing the front window portion.
Figure 7A:
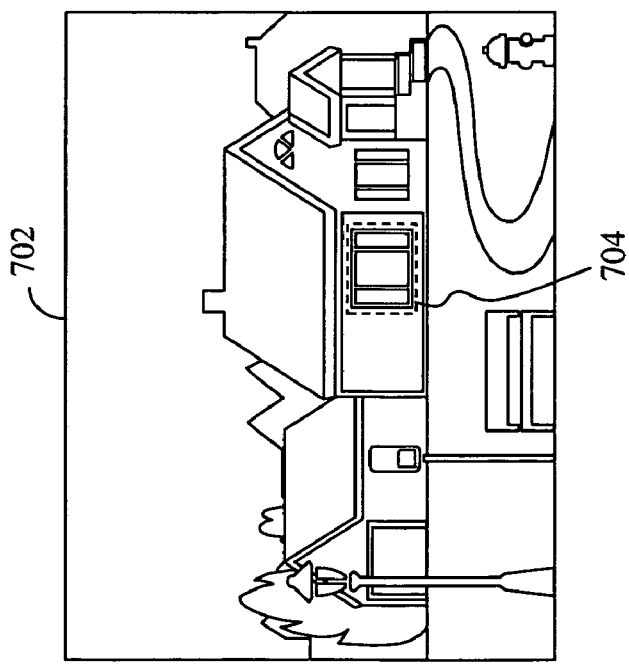

Digital zoom is an application that uses a small set of signals from an image sensor array but displays that small set of signals as a full image. FIG. 7A illustrates an image of a house captured by an image sensor 702. However, the user is interested in viewing the front window portion. A mechanism is provided for the user to move a window 704 over the region of interest (ROI). The size of the window 704 is adjustable by the user to enclose the entire region (a front window of the house) as shown in FIG. 7A. After an activation of a trigger, only signals corresponding to the ROI are readout and then processed in the pixel processor. The ROI is then properly displayed on a screen 706 in which only the front window of the house is displayed as illustrated in FIG. 7A.

Figure 7B:
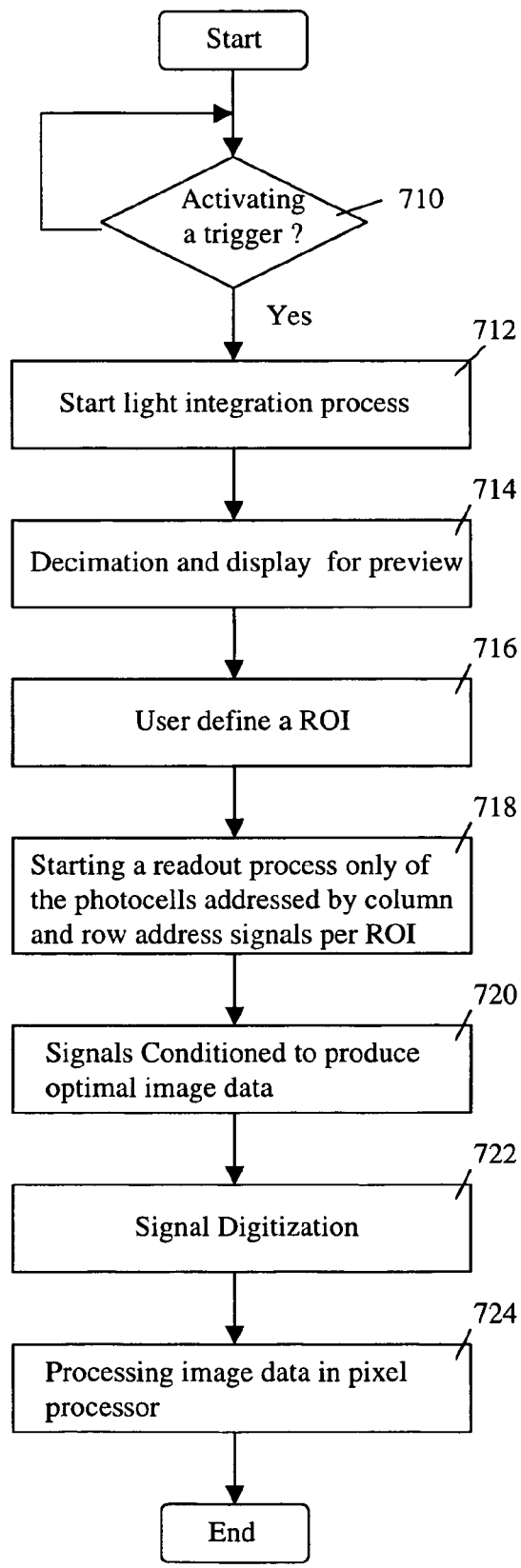
FIG. 7B shows the decimation process flowchart according to one embodiment of the present invention.

FIG. 7B shows the process flowchart according to one embodiment of the present invention. At step 710, the image sensor is ready for the light integration process but waits for a triggering signal that may come from a shutter release of a digital camera or "On" button from a video camera. Upon being triggered, the image sensor starts the light integration process at block 712, accumulating photons of incident light for a predefined exposure time. To view the captured image, the signals in the image sensor are read out in an appropriate manner for a display for preview at step 714. A preview display is typically small and low resolution. For example, a typical pre-view screen may be two or three inches along its diagonal with a resolution of 70 dots-per-inch (DPI). A decimation process, as explained below, selectively reads out a limited number of pixels for display on the preview display.

At step 716, the user defines a window by moving and adjusting the window around a region of interest (ROI), which inherently defines the boundary parameters and thus the window gating signals. As soon as the user is done with the region of interest, the signals in the photo sensor array corresponding to the region of interest are readout at step 718 with respect to the window gating signals. At step 720, the readout signals are processed by the CDS bank and the PGA bank. At step 722, the ADC bank digitizes the analog signals to produce a set of digital signals representing the region of interest defined by the boundary parameters.

The set of digital signals is then processed in the pixel processor at step 724. An interpolation methodology is implemented in the pixel processor to expand the limited pixel data. According to one embodiment, a neighbor linear interpolation approach is used. Specifically, a "missing" pixel is created by interpolating from its neighbor pixels. Those skilled in the art understand that there are other interpolating methods that may be implemented in the pixel processor.

Figure 7C:
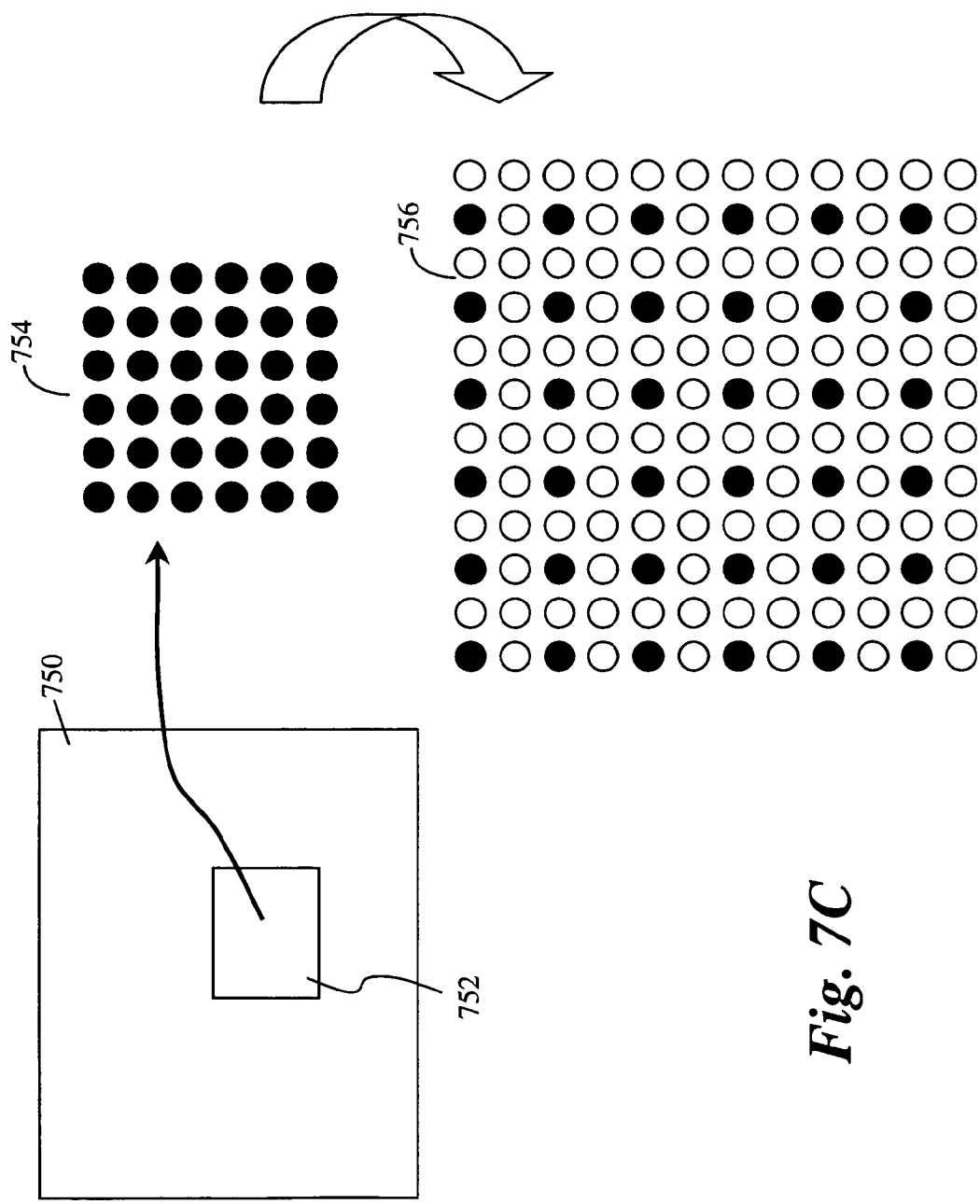
FIG. 7C shows an example of a small portion of signals from the image sensor being enlarged by the interpolation process.

FIG. 7C conceptually illustrates an example of a small portion of signals 754 from the image sensor array being enlarged by the interpolation process. After the image 750 is displayed, the user defines the region of interest by moving and adjusting the window 752 to surround it. The addresses identifying the corresponding photo sensors 754 on the image sensor array are inherently determined and the signals thereof are correspondingly read out. The digital version of the signals is subsequently processed in the pixel processor for interpolation. In this example, an interpolated image 256 has spatial resolution 4 times as large as the original corresponding photo sensors 754. Specifically the whites dots are interpolated from the neighboring image pixels (directly from the photo sensors).

Pixel Decimation

Pixel decimation is a process that samples the signals from the photo sensors for low resolution needs. For example, not all the pixel signals from the image sensor are needed for a preview image on a small screen. Specifically, a small preview display screen located on digital camera system can only display a limited amount of data. Thus, it would be desirable to incorporate systems for reducing the amount of data that is output from the image sensor device in certain situations.

Photo Sensor Skipping Pixel Decimation

One method of reducing the amount of data that is output is to skip certain photo sensors during read out. According to one embodiment of the present invention, both the column and row decoders are configured to cause signals to be read out from every other photo sensors. Other repeated patterns (such as every third or every fourth photo sensor) can also be read out from the photo sensor array.

FIG. 8A illustrates an embodiment wherein the signals from an array of photo sensors 800 are being decimated by a factor of two. Through a set of predefined parameters, both column and row decoders produce, respectively column and row address signals 802 and 804. In other words, column and row address signals 802 and 804 identify which signals from the array of photo sensors 800 are read out. As illustrated in FIG. 8A, column and row address signals 802 and 804 cause signals from every other photo sensor to be read out to column buses 806.

Figure 8B:
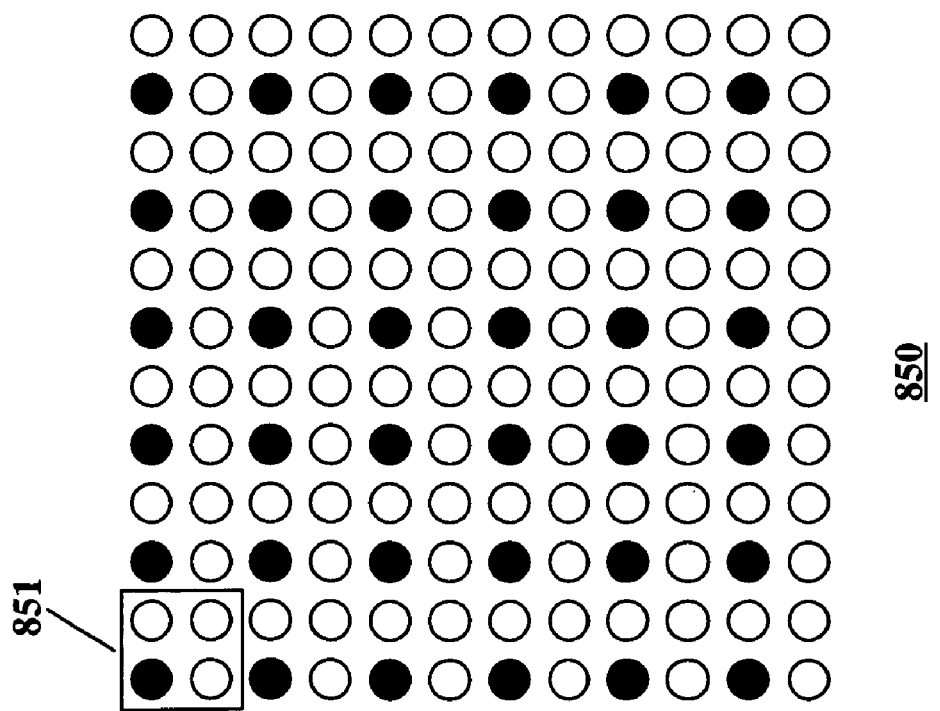
FIG. 8B illustrates a conceptual diagram of pixels being decimated.

FIG. 8B illustrates a conceptual diagram wherein only every other row and column from array 850 is activated during read out to produce a low-resolution pixel image 860. Numerically, the spatial resolution of the digital version 860 is one quarter of that of the array of photo sensors 850. Similarly, the readout speed is also improved four times. Those skilled understand that the decimation process is not possible in CCD image sensor in which all signals must be sequentially shifted out and subsequently stored in a large memory for decimation.

One very important use for pixel decimation is digital camera parameter adjustment. As set forth in the previous section, window gating allows a small subarea to be used for auto focusing. Similarly, pixel decimation can be used to read out low resolution images that sample that may be used to set the image capture parameters for a digital camera. In one embodiment, the camera's control system captures a decimated image that provides low-resolution pixel information from the entire pixel array area. The low-resolution image information is processed to determine the image quality. Based upon the low-resolution image information, the camera's control system may adjust various camera parameters to improve the image quality. For example, the camera control system may adjust the white balance, the programmable gain amplifiers (PGA), the exposure time, the iris opening size, and/or other camera parameters in order to improve the quality of the final image to be captured. By decimating the image before processing, the camera control system has less data that must be processed for each parameter adjustment iteration. By reducing the time per adjustment iteration, more iterations of parameter adjustment can be performed in the same amount of time. Thus, the camera control system can perform adjustments very quickly such that virtually no latency period exists between when the user points the camera and when the user can capture an image.

Pixel Averaging Decimation

Another method of performing pixel decimation is to combine neighboring pixels into a single pixel. For example, referring back to FIG. 8B, the pixel processor can combine the four pixels in box 851 by averaging the pixel values to produce a single pixel output 861. The pixel averaging operation is similar to interpolation. However, unlike interpolation, the data from the original rows is then discarded. This example would be pixel averaging decimation by ¼ since one pixel would be output for every four input pixels. Decimation can be performed up to 1/N since there are N rows in the pixel processor. Thus, if there were eight rows in the pixel processor, ⅛ pixel averaging decimation could be performed.

Pixel Co-Siting

Pixel Co-siting is a process that combines information from neighbor pixels to create a single pixel. Pixel Co-siting is a type of pixel interpolation that creates the same number of output pixels as there are input photo sensors. Pixel co-siting cures some image artifacts by smoothing the image. FIG. 9A conceptually illustrates a small section of a Bayer pattern pixel array. The first row consists of alternating Red (R) and Green (G) pixels. The second row consists of alternating Green (G) and Blue (B) pixels. The remaining rows follow this pattern of alternating Red (R) and Green (G) pixel rows and alternating Green (G) and Blue (B) pixel rows.

If the first row were to be read out individually, it would not have any blue pixel data. Similarly, if the second row were to be read out individually, it would not have any blue pixel data. Instead, the pixels are "co-sited" wherein adjacent row and column data are combined form a single pixel.

For example, referring to FIG. 9A, the top two rows of the two leftmost columns are combined to form a single pixel.

Specifically, the photo sensors in box 904 are combined to create pixel 905. Note that the pixel processor may average the value of the two green pixels within box 904. An adjacent pixel would be formed from the top two rows of the second and third columns. Specifically, the photo sensors in box 908 are combined to create pixel 909. In this manner, every pixel will be given Red, Green, and Blue pixel values. Although this example performs pixel co-siting with four photo sensors, pixel co-siting can be performed with other numbers of pixels. For example, FIG. 9B illustrates a pixel co-siting example with nine neighboring pixels.

Additional Features in Pixel Processor

To reduce the design complexity and to increase the performance of an imaging system employing the current CMOS image sensor, additional features may be implemented in the pixel processor.

In a digital camera, the common image formats of the output are preferably the Graphic Interchange Format (GIF) and the Graphic Interchange Format (GIF). In video, the common image formats of sequence of images include MPEG (Moving Picture Experts Group) and some emerging standards for video stream. All of these image formats are supported by the World Wide Web protocol, such as HTTP. Conventionally, the format transformation from the pixel signals to one of the commonly used formats is carried out in a separate processor in the imaging system (e.g. the digital or video camera). For example, many imaging systems use a desktop personal computer along with an appropriate compression program. Such existing approaches present either considerable latency that may be experienced by a user or a complicated configuration.

According to one embodiment, the image sensor 300 has 1024 by 768 photo sensors that could produce 786,431 pixel charge signals. When the charge signals are digitized to the 10-bit precision, there would be nearly one megabyte of image data. Together with a sequence of images for video applications, the amount of data would be too big to be used and must be compressed before an apparatus coupled thereto can accommodate them.

As described above, the on-chip memory 317 of FIG. 3A may be loaded with instructions (microcode) that perform a pixel processing application. In one embodiment, a pixel processor program is executed in the pixel processor 318 to perform an image format transformation such that the output of the image sensor device 300 is in conformation with an image standard. The exact implementation of a compression program is not provided herein to avoid obscuring aspects of the present invention. Those skilled in the art appreciate that such microcode is available for general-purpose digital signal processors (DSP). The important feature of compressing pixel signals within an image sensor, contrary to those general-purpose DSPs, is that there are no additional memory needed to pre-store the pixel signals. The pixel signals from the ADC bank are compressed as they are coming. As a result, the overall signal throughput of the imaging system is not degraded due to the compression procedure in addition to the elimination of a large memory.

Furthermore, the pixel processor may be configured to output only black and white pixel signals. Referring to FIG. 10, pixel signals 1002 from the R, G, and B photo sensors in the array of photo sensors are in a color format. Thus, signals from each group of the R, G, and B photo sensors compose a red, green, or blue color pixel, respectively. There several ways to internally convert the signals from the R, G, and B photo sensors to gray-scale intensity signals.

One of the methods is to apply different weights to the different components; for example, 0.299R, 0.587G and 0.114B. The sum of the weighted color components result in a gray-scale intensity value.

Another way as illustrated in FIG. 10, a group of four signals from a geometric group 1004 of the photo sensors are averaged to produce a gray-scale intensity value 1006. Therefore, the pixel signals are decimated by a factor of two while being converted to gray-scale intensity signals. Alternatively, each signal from a photo sensor 1008 or 1010 is weighted differently and directly output as a gray-scale intensity 1012 and 1014 to preserve the original spatial resolution.

Another way is to simply output the values from the green photo sensors in Bayer pattern array. This method works well since the green sensor captures the most light and the human eye is most tuned to green light.

The present invention has been described in sufficient detail with a certain degree of particularity. It is understood to those skilled in the art that the present disclosure of embodiments has been made by way of examples only. Numerous changes in the arrangement and combination of parts may be made without departing from the spirit and scope of the invention as claimed. Accordingly, the scope of the present invention is defined by the appended claims rather than the forgoing description of embodiments.

We claim:

1. A method for facilitating high signal throughput of an improved CMOS image sensor comprising a plurality of photo sensors configured in a two-dimensional area, said method comprising:

reading out charge signals from said plurality of photo sensors row by row in parallel to respective column buses; said column buses coupled to a double sampling circuit and a programmable gain amplifier;

producing pixel signals by digitizing said charge signals with an analog-to-digital converter;

conditioning said charge signals in said programmable gain amplifier in accordance with said double sampling circuit before said charge signals are digitized to produce the pixel signals; and processing said pixel signals in a pixel processor to produce a desired result.

2. The method as recited in claim 1 wherein said pixel processor, said double sampling circuit and said programmable gain amplifier are monolithically integrated with said plurality of photo sensors of the CMOS image sensor.

3. The method as recited in claim 1 wherein said conditioning said charge signals comprises:

deriving a measurement difference of each of said charge signals with a reference in said double sampling circuit; and adjusting said each of said charge signals with respect to said measurement difference said programmable gain amplifier.

4. The method as recited in claim 1 wherein said desired result is a compressed format of said pixel signals and wherein said processing said pixel signals in a pixel processor comprises compressing said pixel signals according to a commonly used compression standard.

5. The method as recited in claim 4 wherein the commonly used compression standard is selected from a group consisting of Graphic Interchange Format (GIF), JPEG (Joint Photographic Experts Group) and MPEG (Moving Picture Experts Group) supported by a World Wide Web protocol.

6. The method as recited in claim 1 wherein said desired result is a gray-scale intensity image and wherein said processing said pixel signals in a pixel processor comprises converting said pixel signals respectively to intensity data according to a predefined conversion standard.

7. An architecture for facilitating high signal throughput of an improved CMOS image sensor comprising a plurality of photo sensors configured in a two-dimensional area, said architecture comprising:

a pair of column address and row address decoders providing address signals to address each of the plurality of photo sensors;

a number of signal conditioning circuits, said signal conditioning circuits comprising a correlated double sampling circuit and a programmable gain amplifier, said signal conditioning circuits coupled to a column data bus for receiving charge signals read out from said photo sensors when said photo sensors are addressed by said address signals;

a number of analog-to-digital converters, each respectively coupled to one of said conditioning circuits and digitizing said charge signals in parallel to produce pixel signals; and a pixel processor for receiving said pixel signals from said analog-to-digital converters, wherein said pixel signals are processed to produce a desired result.

8. The architecture as recited in claim 7 wherein said correlated double sampling circuit derives a measurement difference of each of said charge signals with a reference.

9. The architecture as recited in claim 8 wherein said programmable gain amplifier receives said measurement difference and adjusts said each of said charge signals with respect to said measurement difference.

10. The architecture as recited in claim 8 wherein each of the signal conditioning circuits produces a signal that indicates an optimum exposure time.

11. The architecture as recited in claim 10 wherein said correlated double sampling circuit and said programmable gain amplifier together derive a measurement difference of each of said charge signals with a reference; and calculate said optimum exposure time from said measurement difference.

12. The architecture as recited in claim 7 further comprises a memory storing instructions, said memory coupled to said pixel processor that executes said instructions from said memory to achieve said desired result.

13. The architecture as recited in claim 12 wherein said instructions cause said pixel processor to compress said pixel signals according to a commonly used compression standard.

14. The architecture as recited in claim 13 wherein the commonly used compression standard is selected from a group consisting of GIF_(Graphic Interchange Format), JPEG (Joint Photographic Experts Group) and MPEG (Moving Picture Experts Group) supported by a World Wide Web protocol.

15. The architecture as recited in claim 12 wherein said instructions cause said pixel processor to convert said pixel signals respectively to intensity data according to a predefined conversion standard.

16. The architecture as recited in claim 7 wherein said pixel processor is monolithically integrated with said plurality of photo sensors.

17. The architecture as recited in claim 7 wherein said pixel processor, said correlated double sampling circuit and said programmable gain amplifier are monolithically integrated with said plurality of photo sensors.

18. An architecture for facilitating high signal throughput of an improved CMOS image sensor comprising a plurality of photo sensors configured in a two-dimensional area; said architecture comprising:

a pair of column address and row address decoders providing address signals to address each of the plurality of photo sensors;

a number of signal conditioning circuits, each coupled to a column data bus for receiving charge signals read out from said photo sensors when said photo sensors are addressed by said address signals;

a number of analog-to-digital converters, each respectively coupled to one of said conditioning circuits and digitizing said charge signals in parallel to produce pixel signals;

a pixel processor for receiving said pixel signals from said analog-to-digital converters;

a memory loaded with one or more instructions accessed by the pixel processor; and wherein said pixel signals are processed to produce a desired result.

19. The architecture as recited in claim 18 wherein each of the signal conditioning circuits comprises a correlated doubled sampling circuit and a programmable gain amplifier.

20. The architecture as recited in claim 19 wherein said correlated double sampling circuit derives a measurement difference of each of said charge signals with a reference.

21. The architecture as recited in claim 20 wherein said programmable gain amplifier receives said measurement difference and adjusts said each of said charge signals with respect to said measurement difference.

22. The architecture as recited in claim 20 wherein each of the signal conditioning circuits produces a signal that indicates an optimum exposure time.

23. The architecture as recited in claim 22 wherein said correlated double sampling circuit and said programmable gain amplifier together derive a measurement difference of each of said charge signals with a reference; and calculate said optimum exposure time from said measurement difference.

24. The architecture as recited in claim 19 wherein said pixel processor, said correlated double sampling circuit and said programmable gain amplifier are monolithically integrated with said plurality of photo sensors.

25. The architecture as recited in claim 18 wherein said instructions cause said pixel processor to compress said pixel signals according to a commonly used compression standard.

26. The architecture as recited in claim 25 wherein the commonly used compression standard is selected from a group consisting of GIF (Graphic Interchange Format), JPEG (Joint Photographic Experts Group) and MPEG (Moving Picture Experts Group) supported by a World Wide Web protocol.

27. The architecture as recited in claim 18 wherein said instructions cause said pixel processor to convert said pixel signals respectively to intensity data according to a predefined conversion standard.

28. The architecture as recited in claim 18 wherein said pixel processor is monolithically integrated with said plurality of photo sensors.

* * * * *